United States Patent
Cho et al.

(10) Patent No.: US 10,638,357 B2
(45) Date of Patent: Apr. 28, 2020

(54) METHOD FOR TRANSMITTING AND RECEIVING DATA IN WIRELESS COMMUNICATION SYSTEM, AND APPARATUS FOR SUPPORTING SAME

(71) Applicant: LG ELECTRONICS INC., Seoul (KR)

(72) Inventors: Heejeong Cho, Seoul (KR); Ilmu Byun, Seoul (KR); Jiwon Kang, Seoul (KR); Genebeck Hahn, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 16/085,966

(22) PCT Filed: Dec. 23, 2016

(86) PCT No.: PCT/KR2016/015242
§ 371 (c)(1),
(2) Date: Sep. 17, 2018

(87) PCT Pub. No.: WO2017/159972
PCT Pub. Date: Sep. 21, 2017

(65) Prior Publication Data
US 2019/0104435 A1    Apr. 4, 2019

Related U.S. Application Data

(60) Provisional application No. 62/309,952, filed on Mar. 17, 2016.

(51) Int. Cl.
*H04W 28/26* (2009.01)
*H04W 72/04* (2009.01)
(Continued)

(52) U.S. Cl.
CPC ........ *H04W 28/0268* (2013.01); *H04W 8/08* (2013.01); *H04W 28/0278* (2013.01);
(Continued)

(58) Field of Classification Search
None
See application file for complete search history.

(56) References Cited

U.S. PATENT DOCUMENTS

2009/0005057 A1* 1/2009 Lee ................. H04W 16/14
455/450
2010/0103889 A1* 4/2010 Kim ................. H04W 74/004
370/329
(Continued)

FOREIGN PATENT DOCUMENTS

EP    2479910     7/2012
WO    2015129985    9/2015

OTHER PUBLICATIONS

PCT International Application No. PCT/KR2016/015242, International Search Report dated Mar. 30, 2017, 3 pages.
(Continued)

*Primary Examiner* — Duc T Duong
(74) *Attorney, Agent, or Firm* — Lee, Hong, Degerman, Kang & Waimey

(57) ABSTRACT

The present invention relates to a method and a apparatus for transmitting and receiving, by a device, data in a wireless communication system. The present invention can provide a method and an apparatus which receive, from a first network node, configuration information of a contention-based resource region, the contention-based resource region indicating a resource region capable of transmitting and receiving data without connecting to the first network node; and transmit a preamble and a specific message in the contention-based resource region on the basis of the configuration information, wherein the configuration information com-
(Continued)

prises: region information indicating the contention-based resource region; a first resource information indicating a resource available in the contention-based resource region; and a second resource information indicating a resource unavailable in the contention-based resource region.

15 Claims, 26 Drawing Sheets

(51) Int. Cl.
| | |
|---|---|
| *H04W 74/08* | (2009.01) |
| *H04W 28/02* | (2009.01) |
| *H04W 76/11* | (2018.01) |
| *H04W 76/27* | (2018.01) |
| *H04W 8/08* | (2009.01) |
| *H04W 36/00* | (2009.01) |
| *H04W 68/02* | (2009.01) |
| *H04L 5/00* | (2006.01) |
| *H04W 80/02* | (2009.01) |

(52) U.S. Cl.
CPC ....... *H04W 36/0022* (2013.01); *H04W 68/02* (2013.01); *H04W 72/04* (2013.01); *H04W 72/0446* (2013.01); *H04W 74/08* (2013.01); *H04W 74/0833* (2013.01); *H04W 76/11* (2018.02); *H04W 76/27* (2018.02); *H04L 5/0007* (2013.01); *H04W 72/042* (2013.01); *H04W 80/02* (2013.01)

(56) References Cited

U.S. PATENT DOCUMENTS

| | | | |
|---|---|---|---|
| 2011/0170515 A1* | 7/2011 | Kim | H04W 72/042 370/330 |
| 2012/0014269 A1 | 1/2012 | Ray et al. | |
| 2012/0044877 A1 | 2/2012 | Ratasuk et al. | |
| 2012/0044878 A1* | 2/2012 | Ratasuk | H04W 74/0866 370/329 |
| 2012/0182977 A1 | 7/2012 | Hooli et al. | |
| 2012/0213196 A1 | 8/2012 | Chung et al. | |
| 2015/0245193 A1* | 8/2015 | Xiong | H04W 4/80 370/328 |
| 2015/0264132 A1* | 9/2015 | Dang | H04L 51/38 709/206 |
| 2018/0124649 A1* | 5/2018 | Yu | H04W 36/00 |

OTHER PUBLICATIONS

European Patent Office Application Serial No. 16894702.6, Search Report dated Sep. 25, 2019, 7 pages.

\* cited by examiner

[FIG. 1]
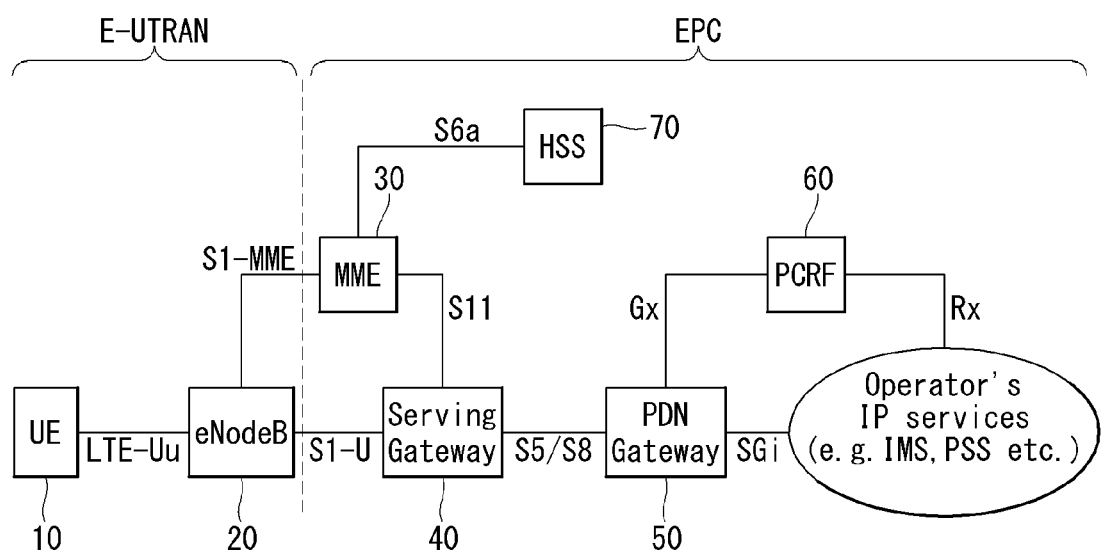

[FIG. 2]
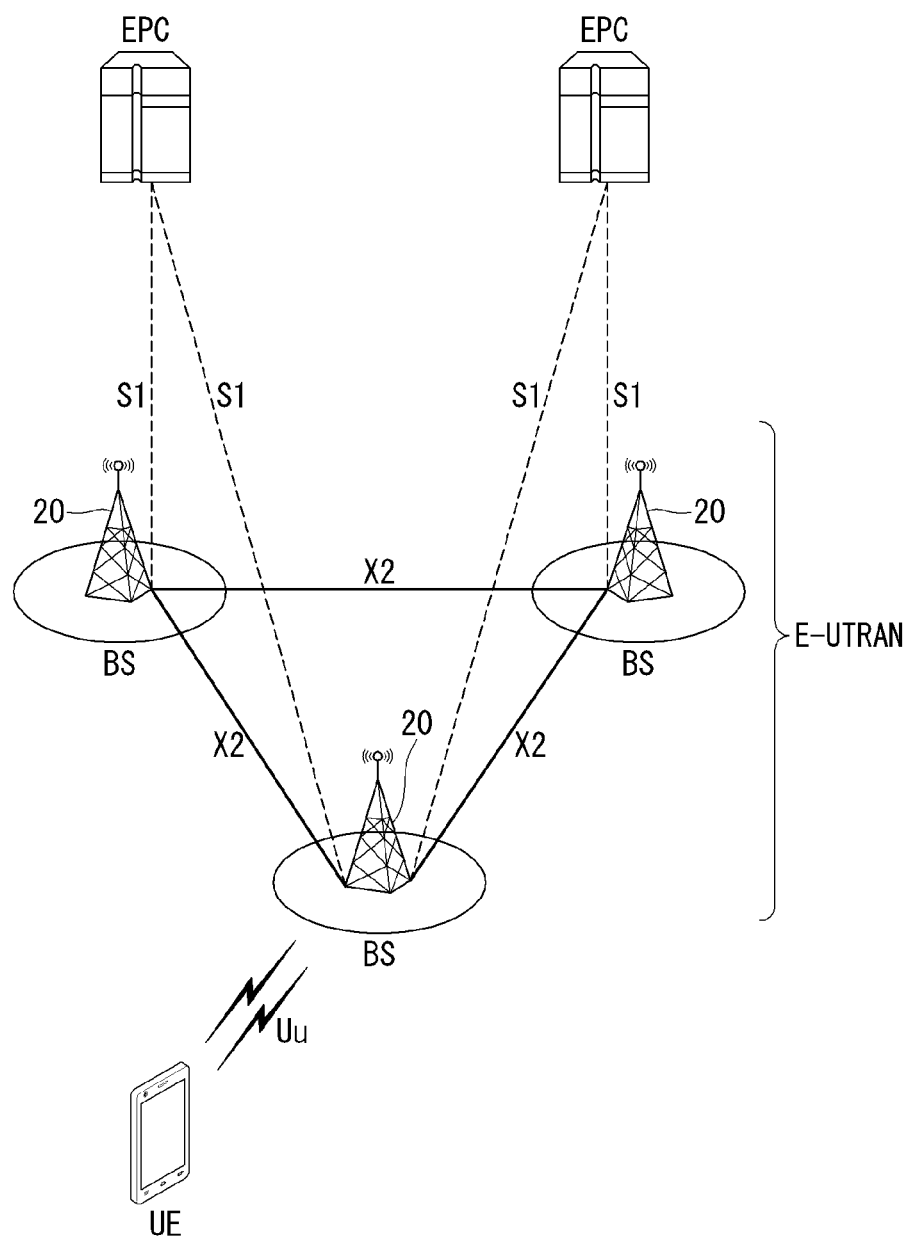

[FIG. 3]
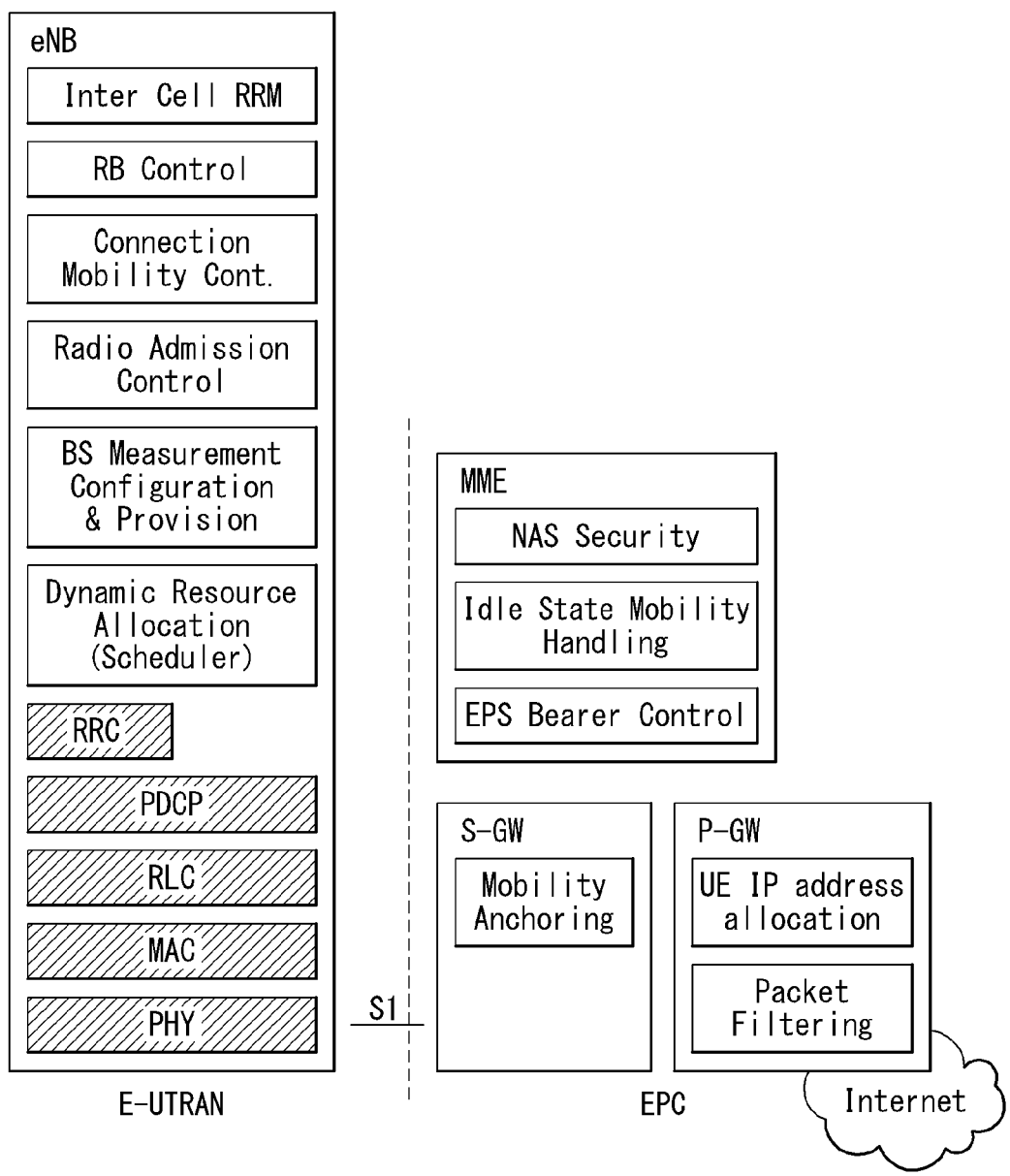

[FIG. 4]
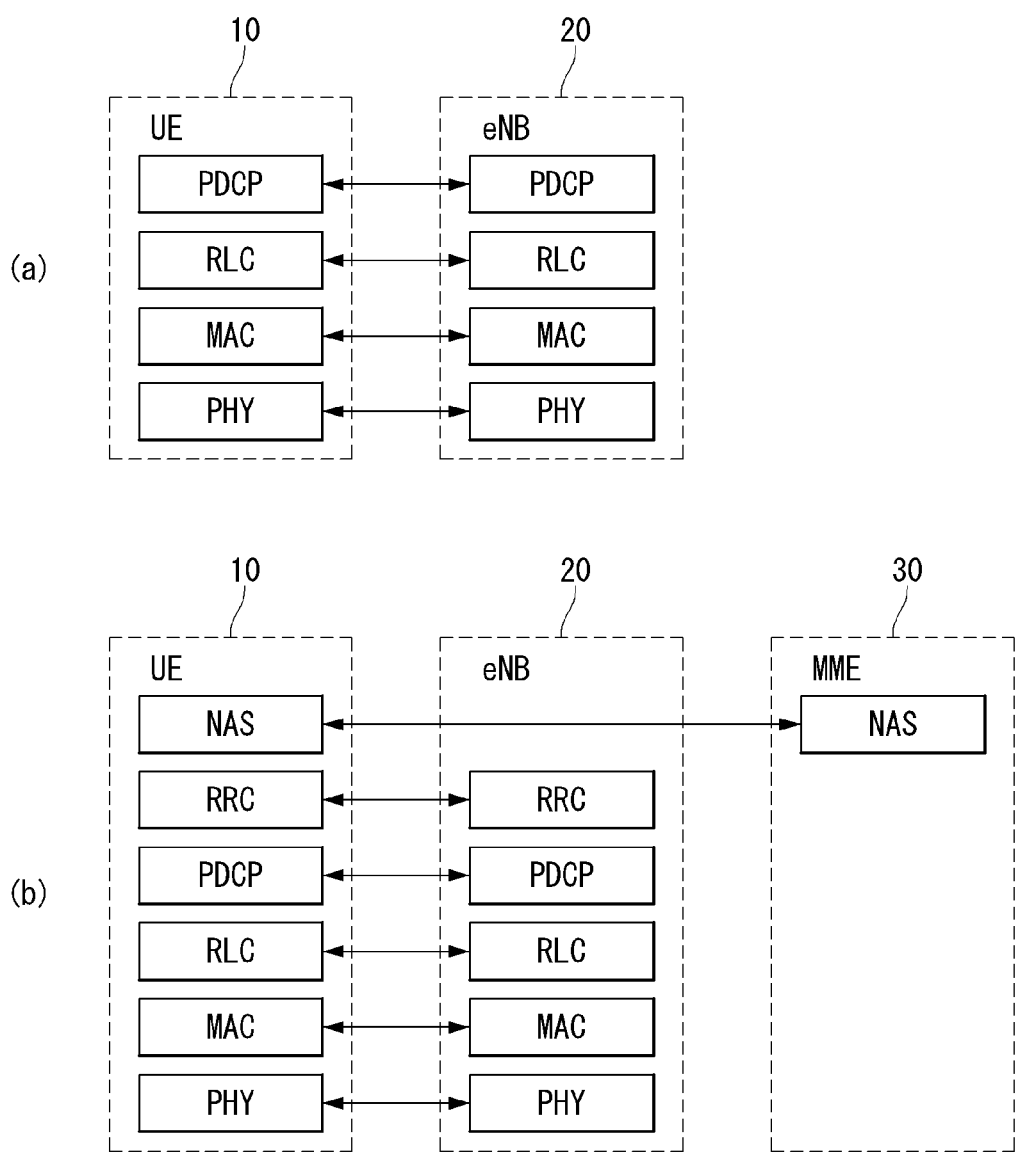

[FIG. 5]
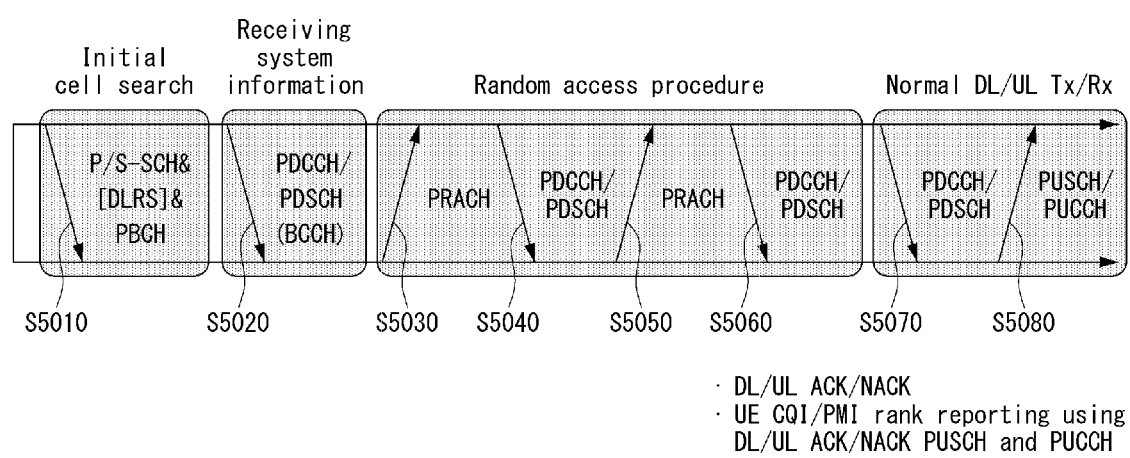

[FIG. 6]
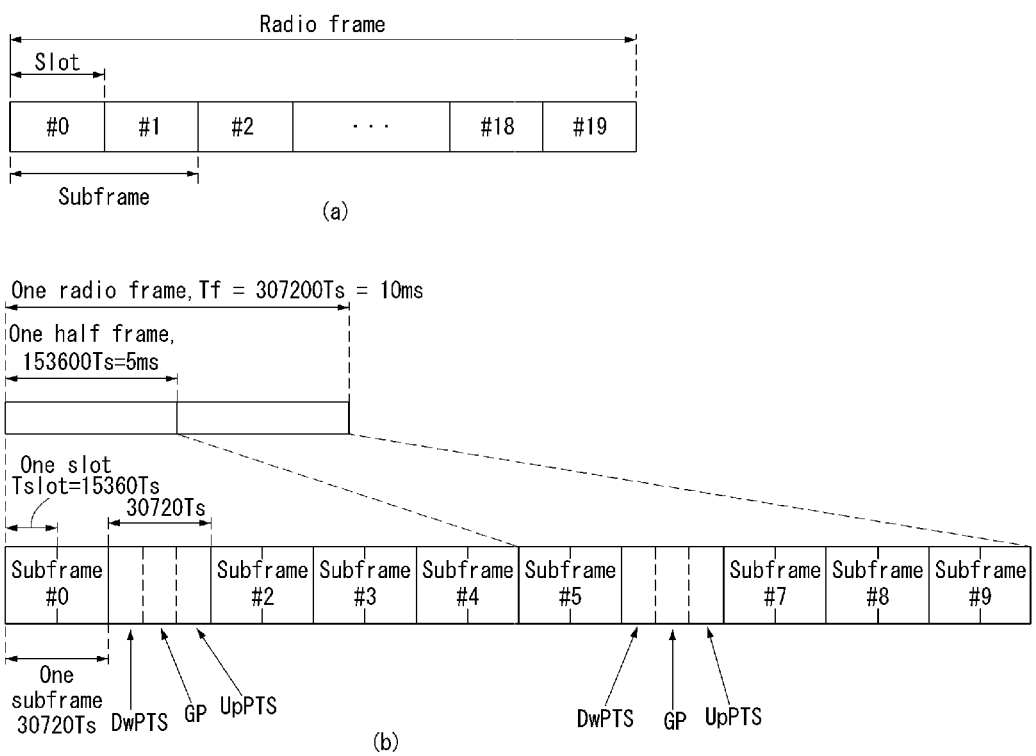

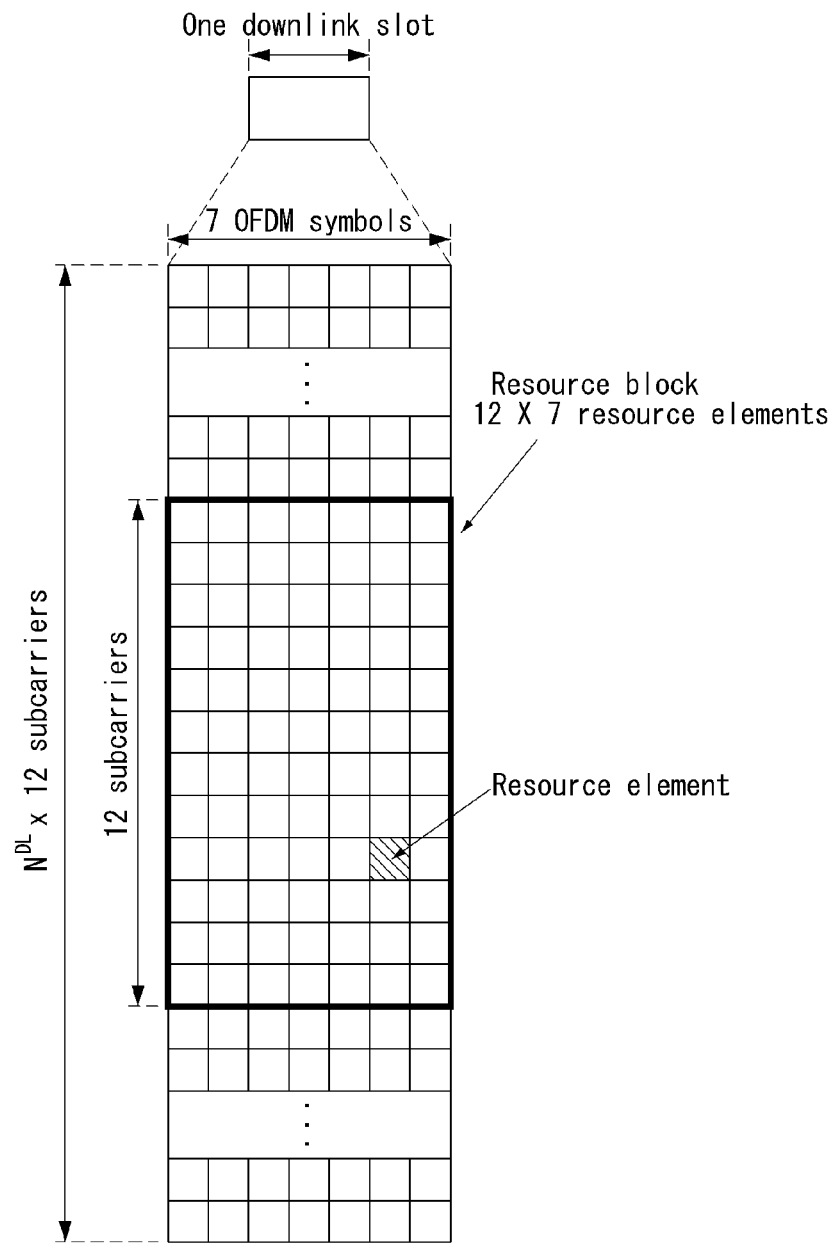
[FIG. 7]

[FIG. 8]
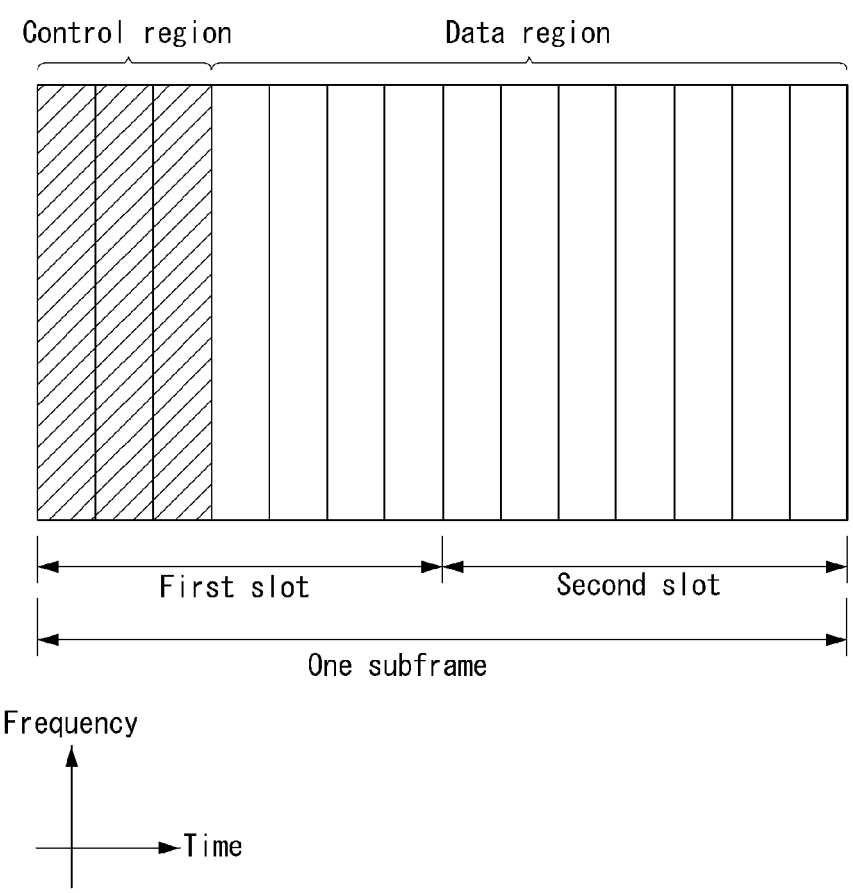

[FIG. 9]
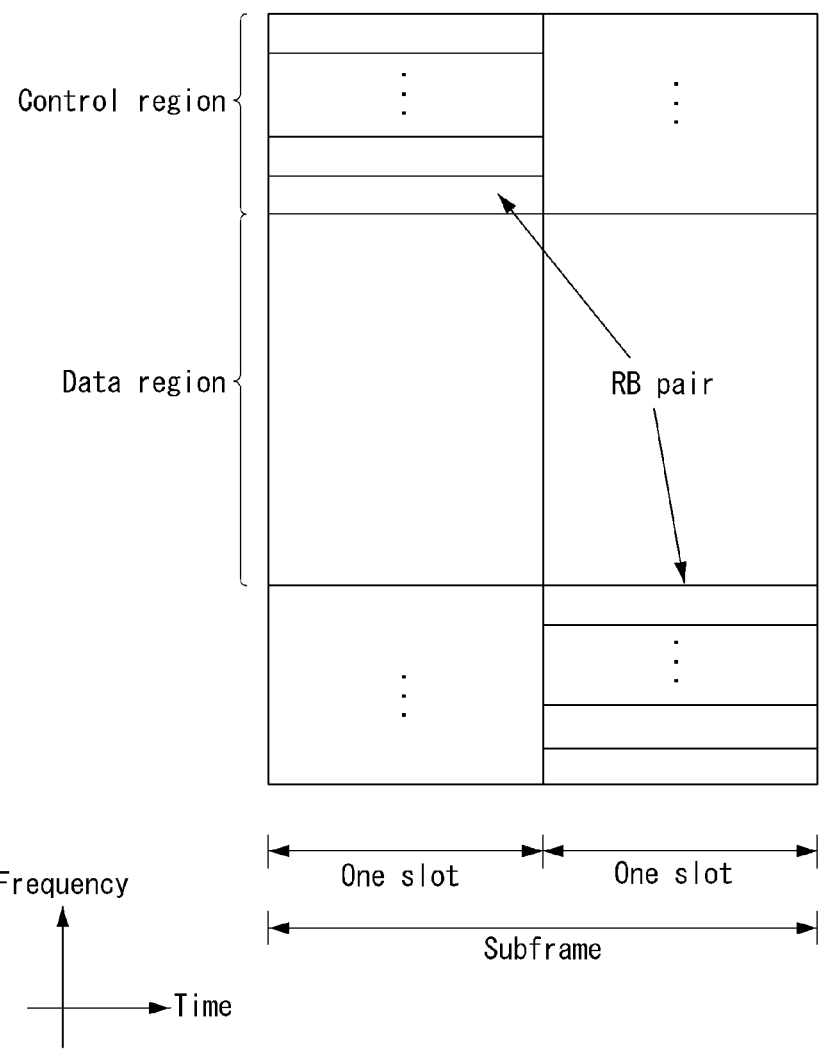

[FIG. 10]
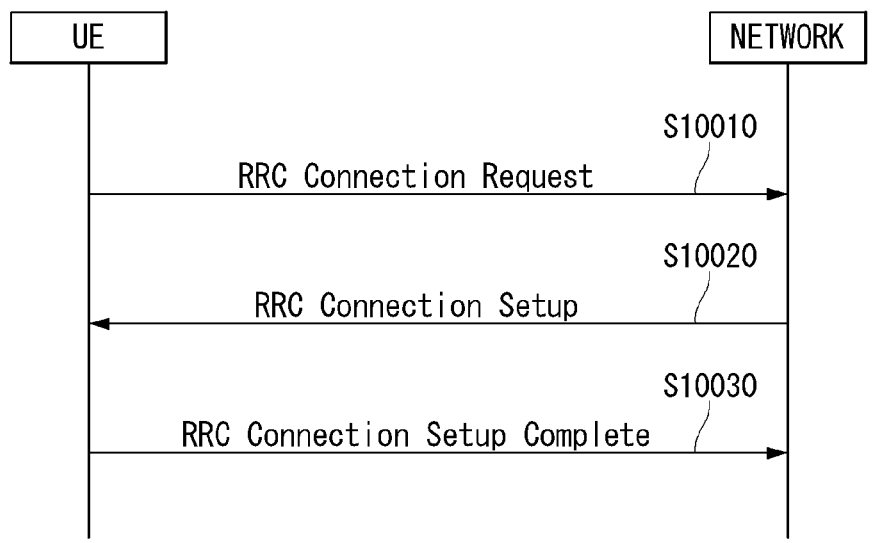
[FIG. 11]
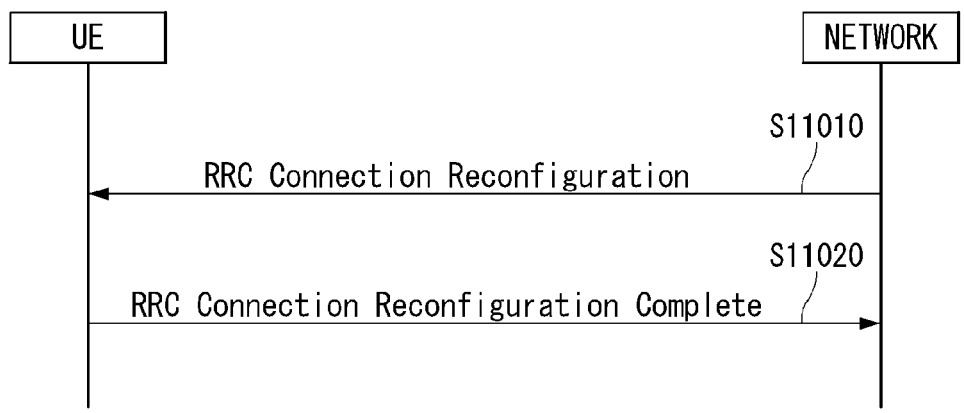

[FIG. 12]
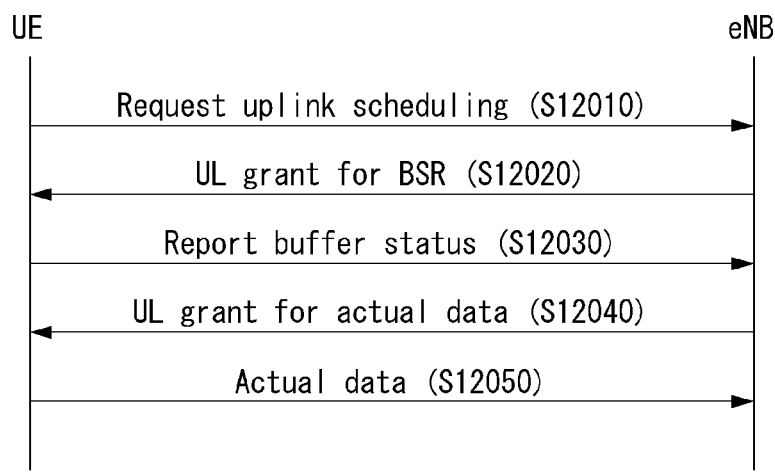
(a)
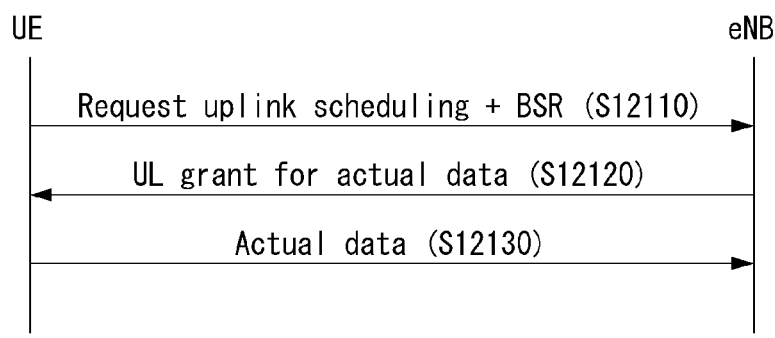
(b)

[FIG. 13]
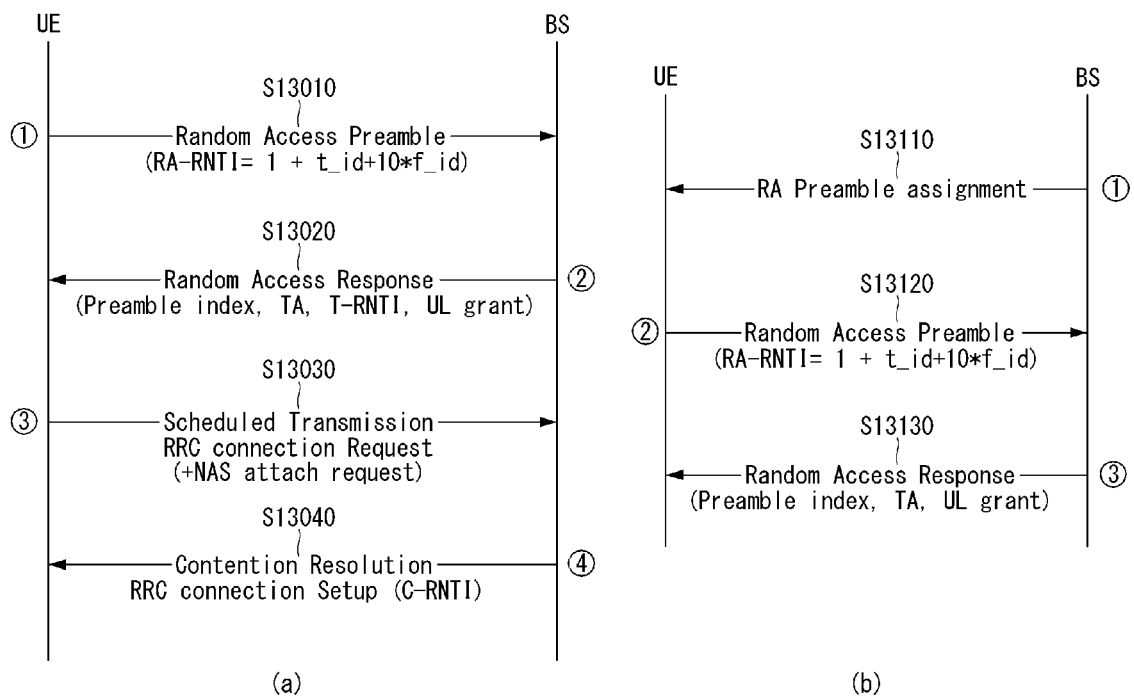

[FIG. 14]
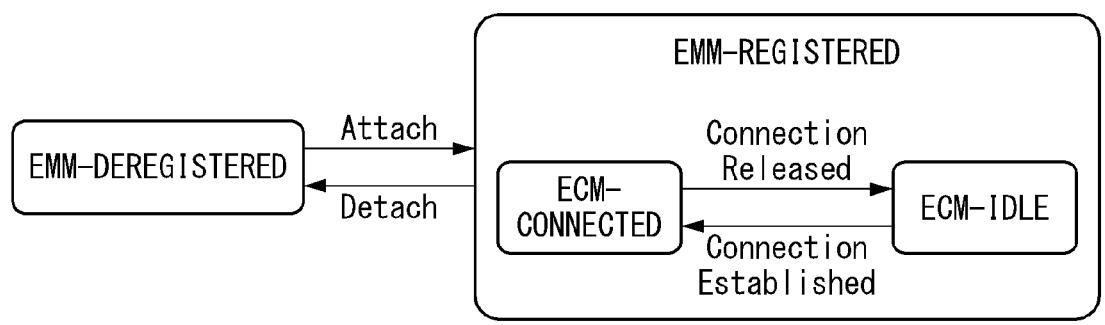
[FIG. 15]
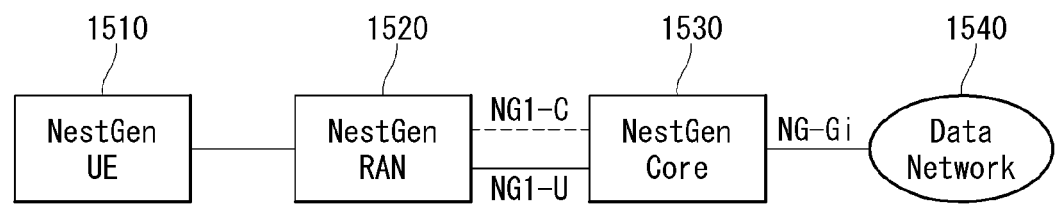

[FIG. 16]
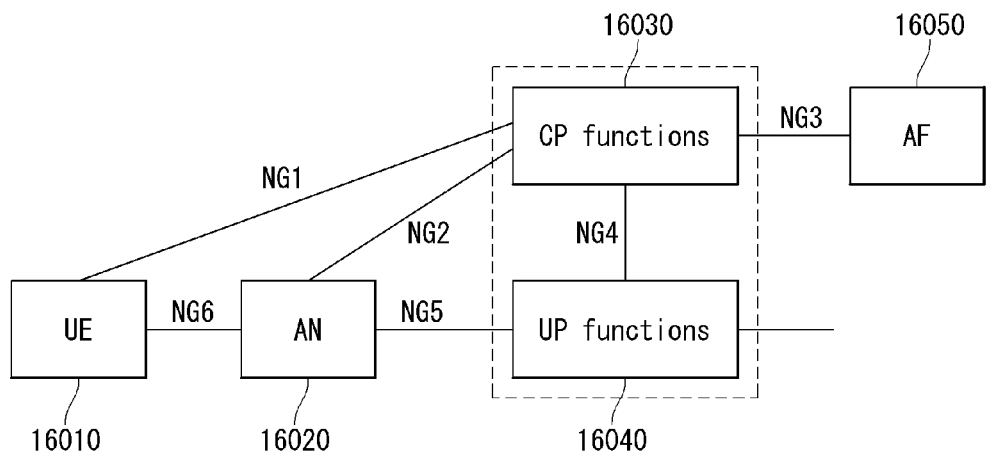
[FIG. 17]
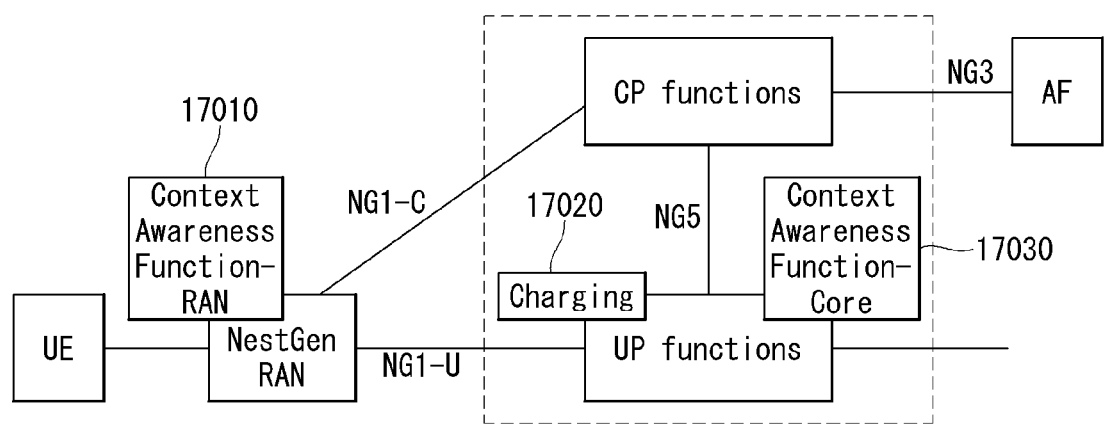

[FIG. 18]
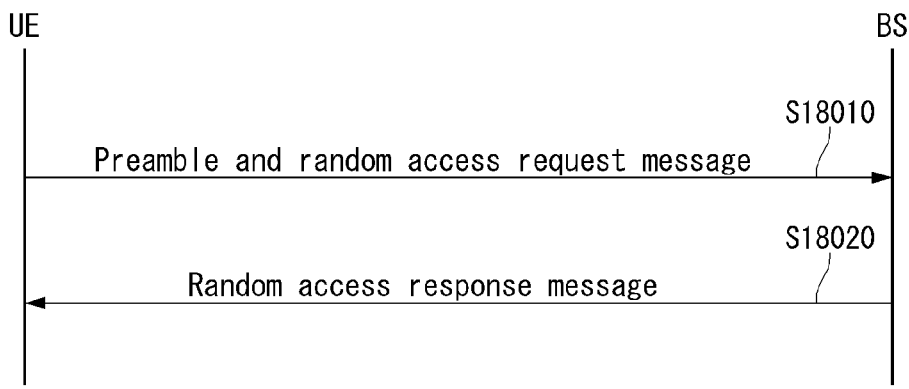
[FIG. 19]
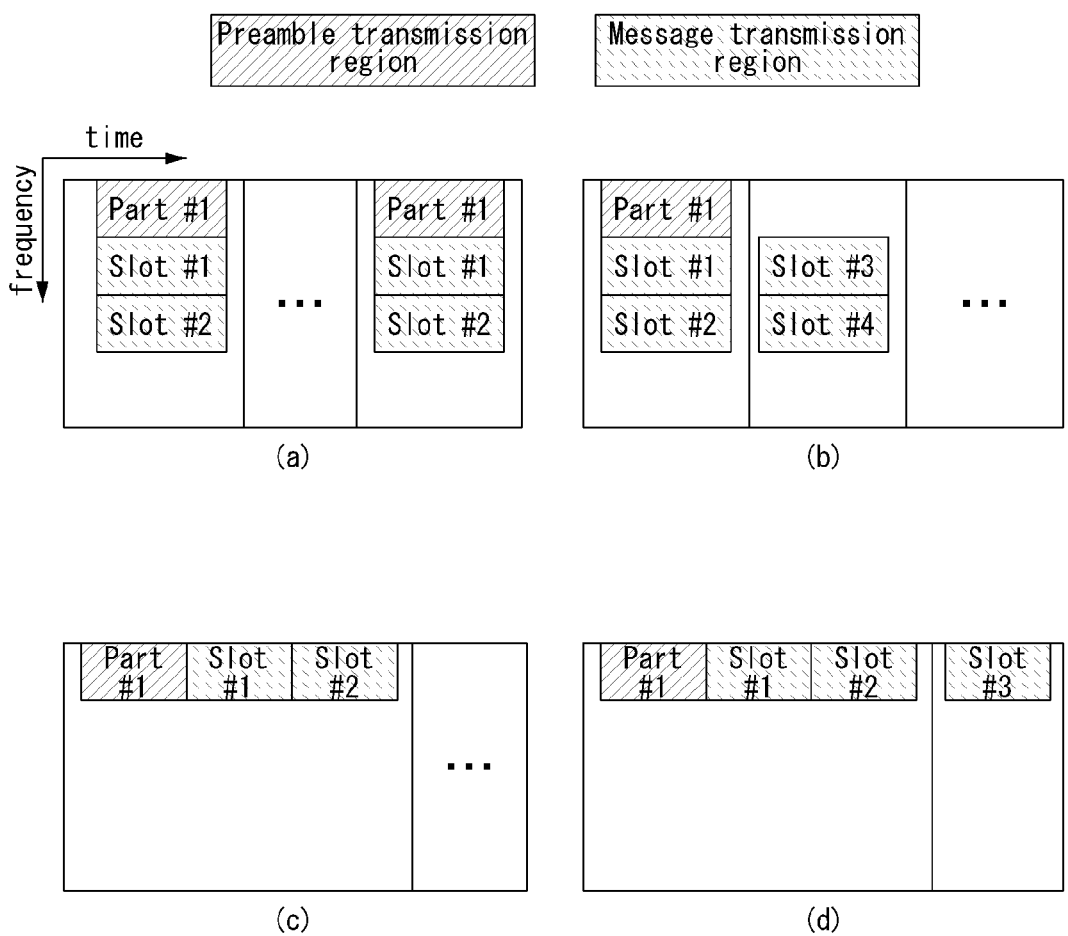

[FIG. 20]
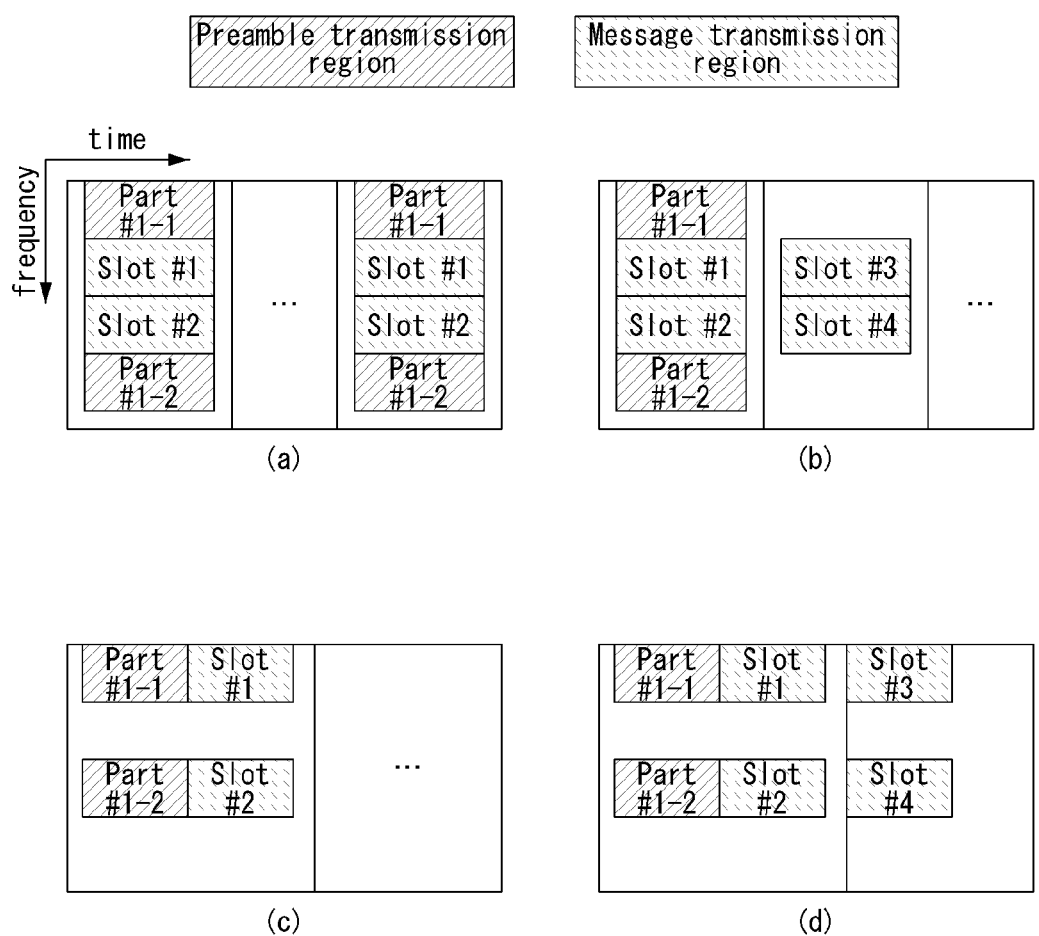

[FIG. 21]
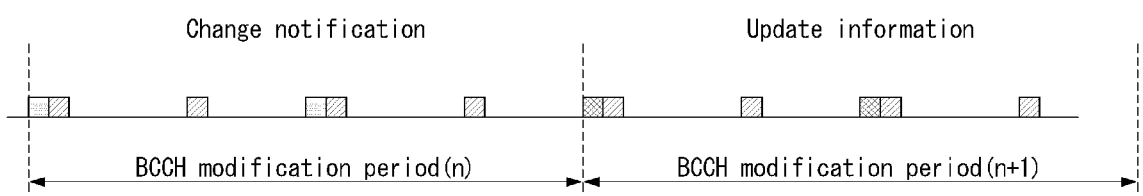

[FIG. 22]
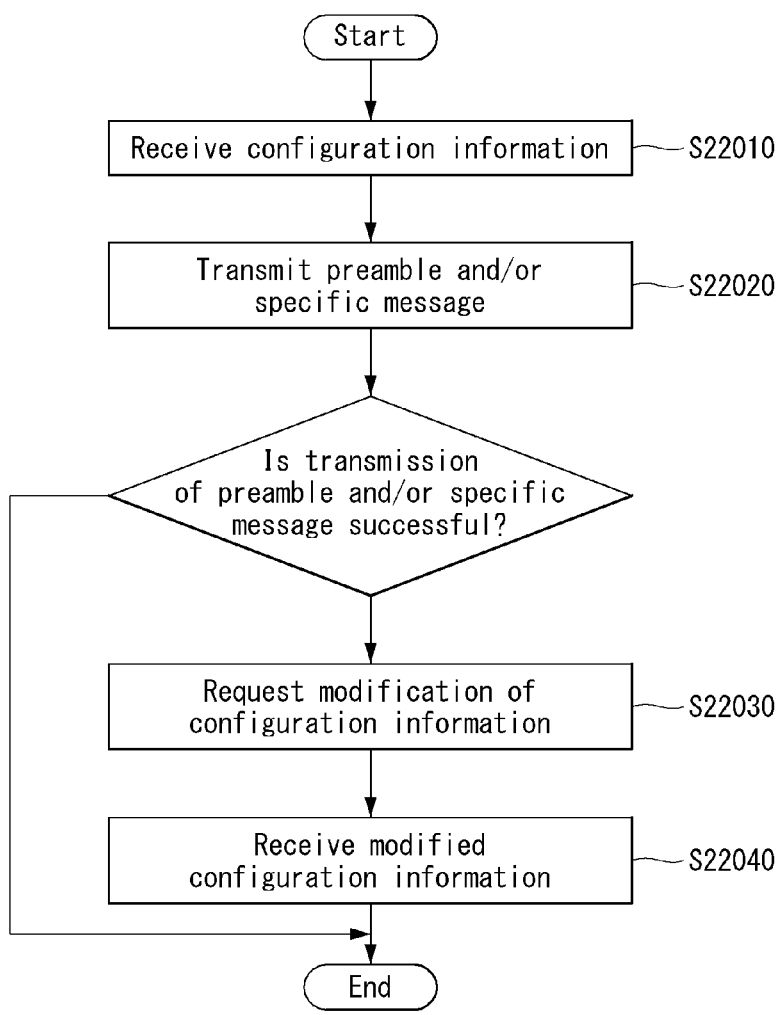

[FIG. 23]
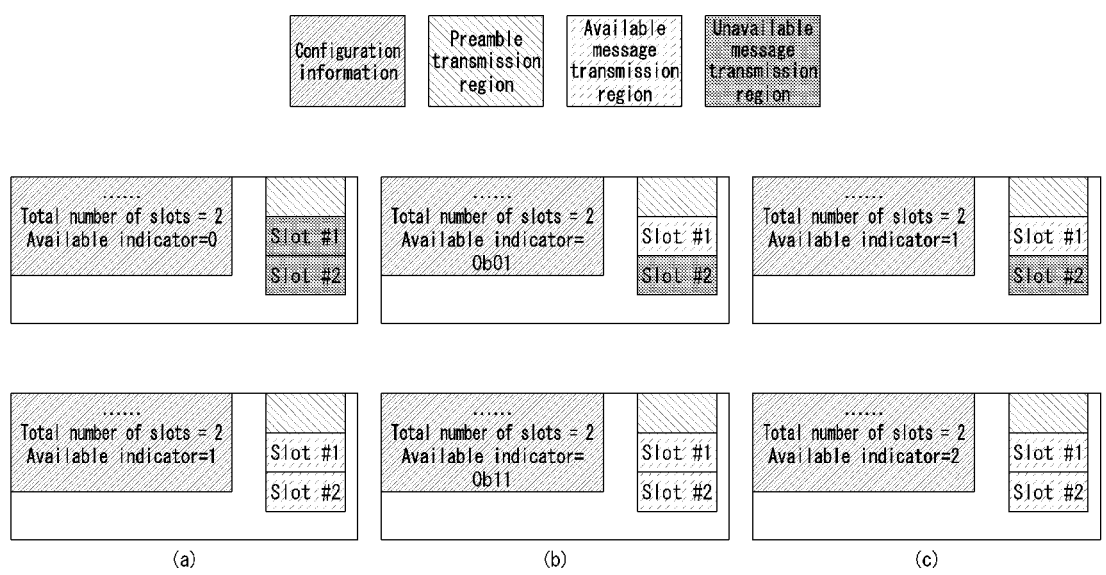

[FIG. 24]
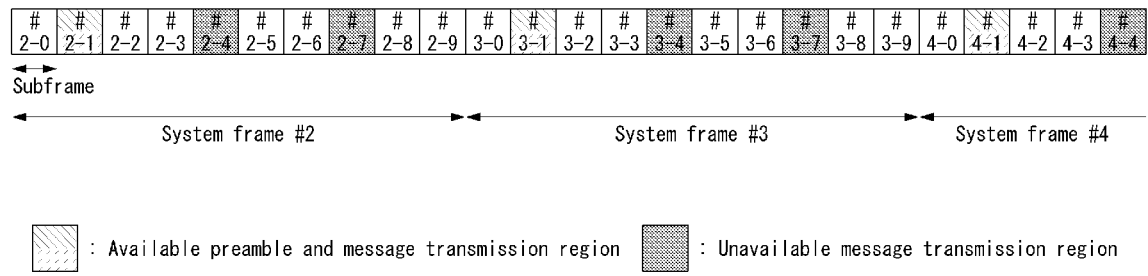

[FIG. 25]
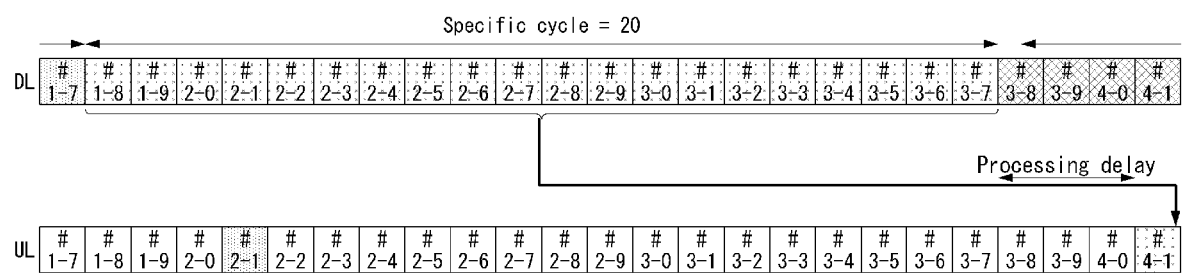

[FIG. 26]
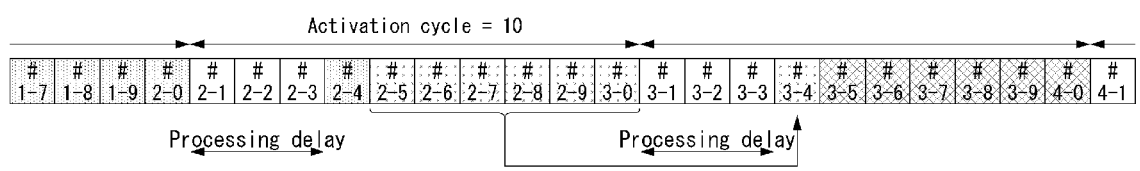

[FIG. 27]
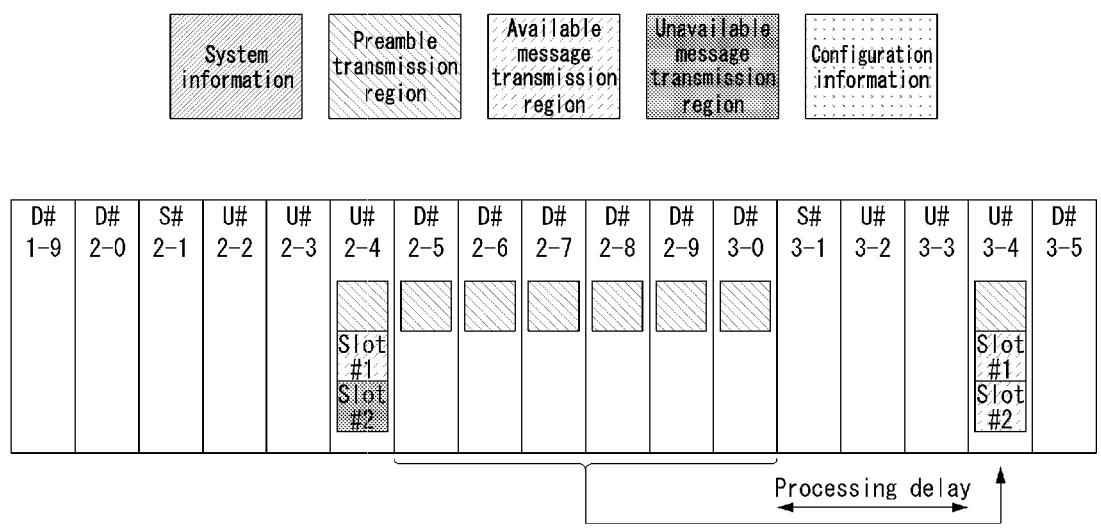

[FIG. 28]
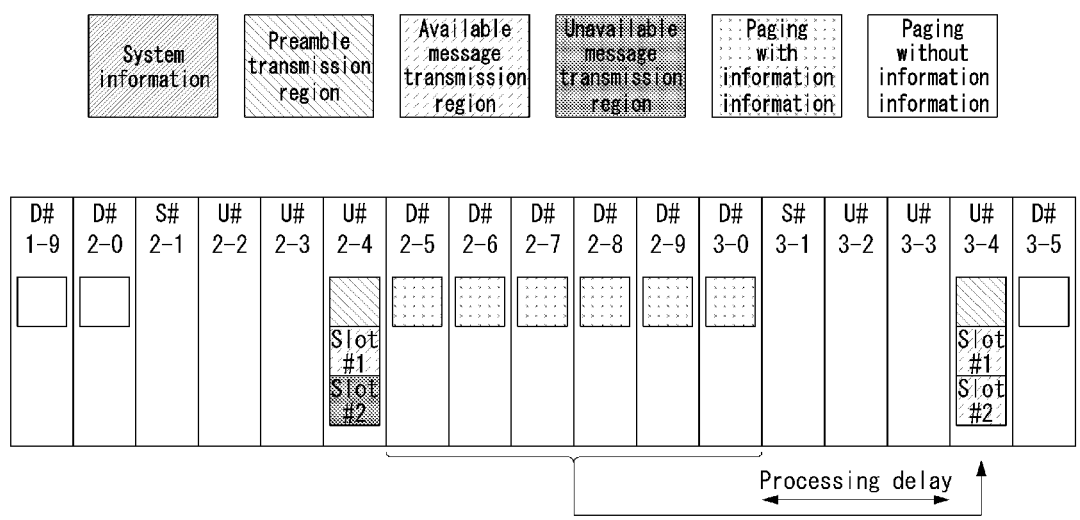

[FIG. 29]
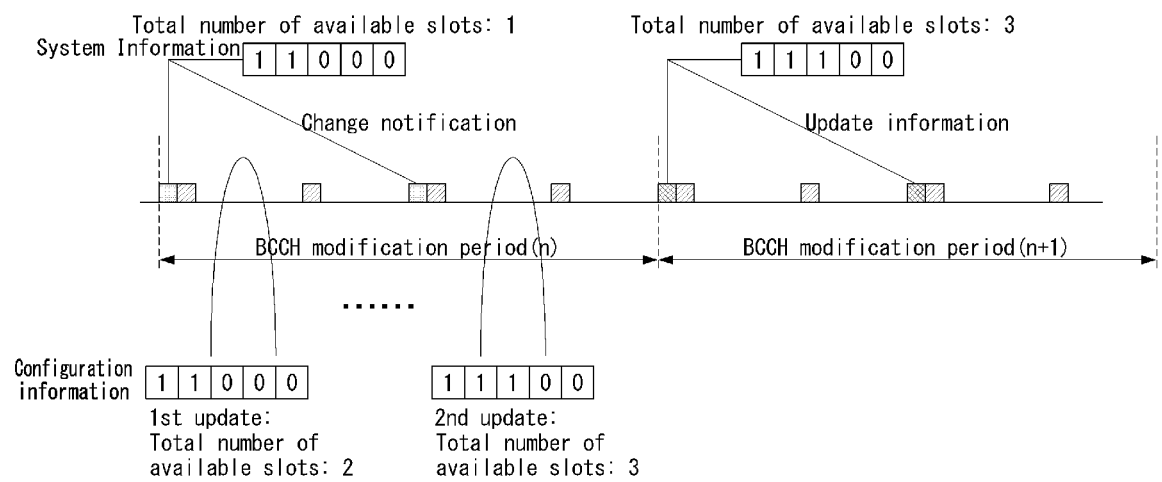
[FIG. 30]
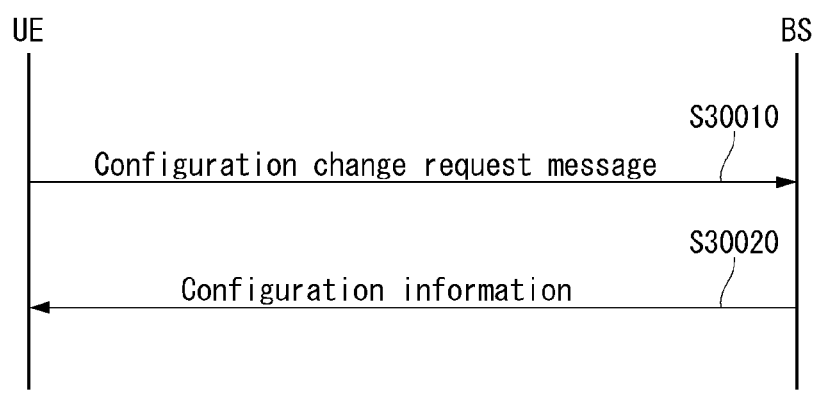

[FIG. 31]
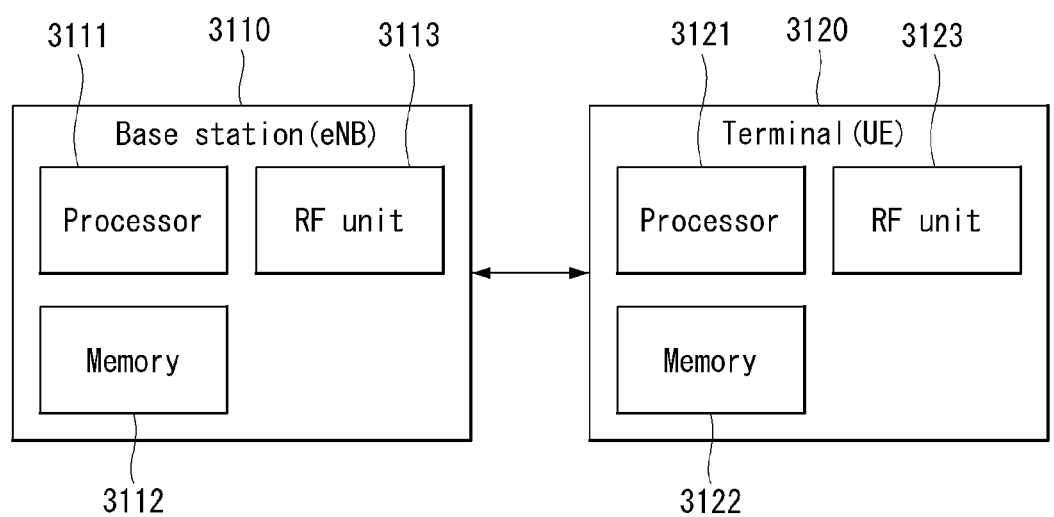

METHOD FOR TRANSMITTING AND RECEIVING DATA IN WIRELESS COMMUNICATION SYSTEM, AND APPARATUS FOR SUPPORTING SAME

CROSS-REFERENCE TO RELATED APPLICATIONS

This application is the National Stage filing under 35 U.S.C. 371 of International Application No. PCT/KR2016/015242, filed on Dec. 23, 2016, which claims the benefit of U.S. Provisional Application No. 62/309,952, filed on Mar. 17, 2016, the contents of which are all hereby incorporated by reference herein in their entireties.

TECHNICAL FIELD

The present invention relates to a method for transmitting and receiving, by a terminal, data in a wireless communication system, and more particularly, to a transmitting and receiving, by a terminal, data by using a contention-based resource, and an apparatus for supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An embodiment of the present invention provides a method and an apparatus for transmitting and receiving data (for example, user data or control message) through a contention based resource region.

An embodiment of the present invention provides a method and an apparatus for dynamically allocating and/or releasing a contention based resource region. Furthermore, an embodiment of the present invention provides a method and an apparatus for transmitting and receiving configuration information indicating an available resource and an unavailable resource of a contention based region in addition to system information.

Furthermore, an embodiment of the present invention provides a method and an apparatus for informing a terminal of dynamic updating of configuration information.

The technical objects of the present invention are not limited to the aforementioned technical objects, and other technical objects, which are not mentioned above, will be apparently appreciated by a person having ordinary skill in the art from the following description.

Technical Solution

In order to solve the problem, the present invention provides a method and an apparatus for transmitting and receiving data by a device in a wireless communication system.

Specifically, provided is a method for transmitting and receiving data by a device in a wireless communication system according to an embodiment of the present invention, which includes: receiving configuration information for dynamic allocation of a contention based resource region from a first network node, the contention based resource region indicating a resource region capable of transmitting and receiving data without connection with the first network node; and transmitting a preamble and a specific message in the contention based resource region based on the configuration information, the configuration information including region information indicating the contention based resource region, first resource information indicating an available resource in the contention based resource region, and second resource information indicating an unavailable resource in the contention based resource region.

Further, the configuration information is modified for each specific period, and the modified configuration information is transmitted to the device within the specific period.

In addition, in the present invention, the modified configuration information is applied after the specific period and a predetermined processing delay.

Further, in the present invention, the modified configuration information includes an identifier indicating whether the configuration information is modified.

Further, in the present invention, the method further includes when the identifier indicates that the configuration information is modified, receiving the modified configuration information from the first network node.

In addition, in the present invention, the configuration information is included in system information, a paging message, or a multi-cast message transmitted through a multi-cast.

Further, in the present invention, the system information, the paging message, or the multi-cast includes an identifier indicating whether the configuration information is modified.

Moreover, in the present invention, the method further includes when the identifier indicates that the configuration information is modified, receiving the modified configuration information from the first network node.

Further, in the present invention, the method further includes: transmitting a request message for requesting modification of the configuration information to the first network node; and receiving a response message including the modified configuration information as a response to the request message.

In addition, in the present invention, the contention based resource region is comprised of a preamble transmission region for the preamble transmission and a message transmission region for transmitting the specific message.

Further, in the present invention, the message transmission region is adjacent to the preamble transmission region along a frequency axis or a time axis or positioned between the preamble transmission regions.

Further, in the present invention, the specific message is a random access request message for requesting random access to the first network node.

In addition, in the present invention, the method further includes receiving a random access response message as a response to the random access request message.

In addition, in the present invention, the random access response message includes resource allocation information allocated for transmission of an uplink message requested by the random access request message.

Further, the present invention provides a device for transmitting and receiving data in a wireless communication system, including: a communication unit transmitting and receiving a radio signal to and from the outside; and a processor functionally coupled with the communication unit, in which the processor, in a method for transmitting and receiving data by the device in the wireless communication system, receives configuration information for dynamic allocation of a contention based resource region from a first network node and transmits a preamble and a specific message in the contention based resource region based on the configuration information, the contention based resource region indicates a resource region capable of transmitting and receiving data without connection with the first network node, and the configuration information includes region information indicating the contention based resource region, first resource information indicating an available resource in the contention based resource region, and second resource information indicating an unavailable resource in the contention based resource region.

Advantageous Effects

The present invention has an advantage in that data (for example, user data or control message) is transmitted and received through dynamic allocation of a contention based resource region, thereby minimizing influences of a terminal and a network.

Further, the present invention has an advantage in that configuration information indicating an available resource and an unavailable resource in a contention based region is transmitted to the terminal in addition to system information, and as a result, the terminal rapidly recognizes a modified contention based resource region to efficiently transmit data.

In addition, the present invention has an advantage in that an identifier to recognize dynamic updating of the configuration information for the contention based resource region is transmitted, and as a result, the terminal can recognize whether to transmit modified configuration information.

Moreover, the present invention has an advantage in that a field to recognize a modification of the system information is reused for the terminal to determine whether to dynamically update the contention based resource region, thereby reducing signaling overhead and terminal complexity.

Advantages which can be obtained in the present invention are not limited to the aforementioned advantages and other unmentioned advantages will be clearly understood by those skilled in the art from the following description.

DESCRIPTION OF DRAWINGS

FIG. 1 is a diagram illustrating one example of an evolved packet system (EPS) related to an LTE system to which the present invention may be applied.

FIG. 2 is a diagram illustrating a wireless communication system to which the present invention is applied.

FIG. 3 is a block diagram illustrating an example of a functional split between an E-UTRAN and an EPC to which the present invention may be applied.

FIG. 4 is a diagram illustrating one example of a radio protocol architecture to which a technical feature of the present invention may be applied.

FIG. 5 is a diagram for describing physical channels used in a 3GPP LTE/LTE-A system and a general signal transmitting method using the same to which the present invention may be applied.

FIG. 6 illustrates one example of an architecture of a radio frame in 3GPP LTE/LTE-A to which the present invention may be applied.

FIG. 7 is a diagram exemplifying a resource grid for one downlink slot in a wireless communication system to which the present invention may be applied.

FIG. 8 illustrates an architecture of a downlink subframe in a wireless communication system to which the present invention may be applied.

FIG. 9 illustrates an architecture of an uplink subframe in a wireless communication system to which the present invention may be applied.

FIG. 10 is a flowchart illustrating a process of establishing RRC connection to which the present invention may be applied.

FIG. 11 is a flowchart illustrating an RRC connection reconfiguration process to which the present invention may be applied.

FIG. 12 is a diagram exemplifying an uplink resource allocation process of a UE in a wireless communication system to which the present invention may be applied.

FIG. 13 illustrates one example of a random access procedure in an LTE system.

FIG. 14 is a diagram exemplifying EMM and ECM states in a wireless communication system to which the present invention may be applied.

FIG. 15 is a diagram illustrating one example of a wireless communication system architecture for supporting a next-generation RAN to which methods proposed by the present specification may be applied.

FIG. 16 is a diagram illustrating one example of a flow based QoS architecture to which the methods proposed by the present specification may be applied.

FIG. 17 is a diagram illustrating one example of an interaction between network functions and a function.

FIG. 18 is a flowchart illustrating one example of data transmission through a contention based resource region to which the present invention may be applied.

FIGS. 19 and 20 are diagrams illustrating one example of a structure of a contention based resource region to which the present invention may be applied.

FIG. 21 is a diagram illustrating one example of a notification process of system information to which the present invention may be applied.

FIG. 22 is a flowchart illustrating one example of a method for transmitting data through configuration information of a contention based resource region to which the present invention may be applied.

FIGS. 23 and 24 are diagrams illustrating one example of the configuration information for the contention based resource region to which the present invention may be applied.

FIGS. 25 and 26 are diagrams illustrating one example of an update period of the configuration information for the contention based resource region to which the present invention may be applied.

FIGS. 27 to 29 are diagrams illustrating one example of, in a case where the configuration information for the contention based resource region is dynamically updated, one example of a method for identifying the configuration information to which the present invention may be applied.

FIG. 30 is a diagram illustrating one example of a method for updating the configuration information through a modification request of the configuration information for the contention based resource region to which the present invention may be applied.

FIG. 31 is a diagram illustrating one example of an internal block diagram of a wireless apparatus to which the present invention may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)' and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 illustrates a wireless communication system to which the present invention is applied.

The wireless communication system may also be called an Evolved-UMTS Terrestrial Radio Access Network (E-UTRAN) or a Long Term Evolution (LTE)/LTE-A system.

The E-UTRAN includes a base station (BS) 20 that provides a control plane and a user plane to user equipment (UE) 10.

The base stations 20 may be interconnected via an X2 interface. The base station 20 is connected to an evolved packet core (EPC) through an S1 interface, more particularly, to a mobility management entity (MME) through S1-MME and a serving gateway (S-GW) through S1-U.

The EPC is constituted by of the MME, the S-GW, and a packet data network-gateway (P-GW). The MME has access information of the terminal or information on a capability of the terminal and the information is mainly used for managing the mobility of the UE. The S-GW is a gateway having the E-UTRAN as an end point and the P-GW is a gateway having the PDN as the end point.

Layers of a radio interface protocol between the UE and the network may be classified into L1 (first layer), L2 (second layer), and L3 (third layer) based on three lower layers of an open system interconnection (OSI) reference model which is widely known in a communication system and among them, a physical layer which belongs to the first layer provides an information transfer service using a physical channel and a radio resource control (RRC) layer positioned in the third layer serves to control a radio resource between the UE and the network. To this end, the RRC layer exchanges an RRC message between the UE and the BS.

FIG. 3 is a block diagram illustrating an example of a functional split between an E-UTRAN and an EPC to which the present invention may be applied.

Referring to FIG. 3, a hatched block represents a radio protocol layer, and an empty block represents a functional entity of the control plane.

The BS performs the following functions: (1) Radio resource management (RRM) function such as radio bearer control, radio admission control, connection mobility control, and dynamic resource allocation to the UE, (2) Internet Protocol (IP) header compression and encryption of user data streams, (3) routing of user plane data to the S-GW, (4) scheduling and transmission of a paging message, (5) scheduling and transmission of broadcast information, and (6) measurement and measurement reporting setup for mobility and scheduling.

The MME performs the following functions: (1) Distribution of the paging message to the BSs, (2) security control, (3) idle state mobility control, (4) SAE bearer control, and (5) non-access stratum (NAS) signaling ciphering and integrity protection.

The S-GW performs the following functions: (1) Termination of a user plane packet for paging and (2) user plane switching for supporting UE mobility FIG. 4 is a diagram illustrating one example of a radio protocol architecture to which a technical feature of the present invention may be applied.

FIG. 4(a) illustrates an example of a radio protocol architecture for a user plane, and FIG. 4(b) is a block diagram illustrating an example of the radio protocol architecture for a control plane.

The user plane is a protocol stack for transmitting user data and the control plane is a protocol stack for transmitting a control signal.

Referring to FIGS. 4(a) and 4(b), the physical layer (PHY) provides the information transfer service to an upper layer using the physical channel. The physical layer is connected to a medium access control (MAC) layer which is the upper layer through a transport channel. Data moves between the MAC layer and the physical layer through the transport channel. The transport channel is classified according to how the data is transmitted through a radio interface and what feature the data is transmitted.

Data move between different physical layers, that is, between the physical layers of a transmitter and a receiver through the physical channel. The physical channel may be modulated by an orthogonal frequency division multiplexing (OFDM) scheme and uses a time and a frequency as the radio resources.

The function of the MAC layer includes mapping between a logical channel and a transmission channel and multiplexing/demultiplexing (a meaning of '/' includes both concepts of 'or' and 'and') to the transport block provided to the physical channel on the transport channel of an MAC service data unit (SDU) which belongs to the logical channel. The MAC layer provides a service to a radio link control (RLC) layer through the logical channel.

The function of the RLC layer includes concatenation, segmentation, and reassembly of the RLC SDUs. In order to guarantee various quality of service (QoS) required by a radio bearer (RB), the RLC layer provides three operating modes of a transparent mode (TM), an unacknowledged mode (UM), and an acknowledged mode (AM). The AM RLC provides error correction through an automatic repeat request (ARQ).

The radio resource control (RRC) layer is defined only in the control plane. The RRC layer serves to control the logical, transport, and physical channels in connection with configuration, re-configuration and release of the radio bearers. The RB means a logical path provided by the first layer (PHY layer) and the second layer (MAC layer, RLC layer, or PDCP layer) for data transmission between the UE and the network.

The function of the packet data convergence protocol (PDCP) layer in the user plane includes transmission of the user data, header compression, and ciphering. The function of the packet data convergence protocol (PDCP) layer in the control plane includes transmission of the control plane data and ciphering/integrity protection.

Configuring the RB means a process of defining the characteristics of the radio protocol layer and the channel to provide a specific service and configuring each specific parameter and operation method. The RB may be divided into a signaling RB (SRB)) and a data RB (DRB) again. The SRB is used as a path for transmitting the RRC message in the control plane and the DRB is used as a path for transmitting the user data in the user plane.

When an RRC connection is established between the RRC layer of the UE and the RRC layer of the E-UTRAN, the UE is in an RRC connected state and if not, the UE is in an RRC idle state.

A downlink transmission channel for transmitting data from the network to the UE includes a broadcast channel (BCH) for transmitting system information and a downlink shared channel (SCH) for transmitting user traffic and a control message. The traffic or control message of a downlink multicast or broadcast service may be transmitted through a downlink SCH or may be transmitted via a separate downlink multicast channel (MCH). Meanwhile, an uplink transmission channel for transmitting data from the network to the UE includes a random access channel (RACH) for transmitting an initial control message and an uplink shared channel (SCH) for transmitting other user traffic or control messages.

Examples of a logical channel existing at an upper layer of the transport channel and mapped to the transport channel include a broadcast control channel (BCCH), a paging control channel (PCCH), a common control channel (CCCH), a multicast control channel (MCCH), a multicast traffic Channel (MTCH), and the like.

The physical channel is constituted by several OFDM symbols in a time domain and several sub-carriers in a frequency domain. One sub-frame is composed of the plurality of OFDM symbols in the time domain. A resource block as a resource allocation unit is constituted by the plurality of OFDM symbols and a plurality of sub-carriers. In addition, each subframe may use specific subcarriers of specific OFDM symbols (e.g., first OFDM symbol) of the corresponding subframe for a physical downlink control channel (PDCCH), i.e., an L1/L2 control channel. A transmission time interval (TTI) is a time unit of subframe transmission.

FIG. 5 is a diagram for describing physical channels used in a 3GPP LTE/LTE-A system and a general signal transmitting method using the same to which the present invention may be applied.

In step S5010, the UE that is powered on again while being powered off or enters a new cell performs an initial cell search operation such as synchronizing with the BS. To this end, the UE receives a primary synchronization channel (P-SCH) and a secondary synchronization channel (S-SCH) from the BS and synchronizes with the BS and acquires information such as a cell ID or the like.

Thereafter, the UE may receive a physical broadcast channel (PBCH) signal from the BS and obtain the in-cell broadcast information. Meanwhile, the UE receives a downlink reference signal (DL RS) in an initial cell search step to check a downlink channel status.

Upon completion of the initial cell search, the UE receives the PDCCH and the PDSCH according to PDCCH information in step S5020 to obtain more specific system information.

Then, the UE may perform a random access procedure such as steps S5030 to S5060 to complete the access to the BS. To this end, the UE may transmit the preamble through a physical random access channel (PRACH) (S5030) and receive a response message to the preamble through the PDCCH and the PDSCH corresponding thereto (S5040). In case of a contention-based random access, the UE may perform a contention resolution procedure such as transmission of an additional PRACH signal (S5050) and reception of a PDCCH signal and a PDSCH signal corresponding thereto (S506).

The UE that performs the above procedure may then receive the PDCCH signal and/or PDSCH signal (S5070) and/or a physical uplink shared channel (PUSCH) signals and/or a physical uplink control channel (PUCCH) signal (S5080) as a general uplink/downlink signal transmission procedure.

Control information transmitted from the UE to the BS is collectively referred to as uplink control information (UCI). The UCI includes HARQ-ACK/NACK, a scheduling request (SR), a channel quality indicator (Cal), a precoding matrix indicator (PMI), rank indication information, and the like.

In the LTE/LTE-A system, the UCI is generally transmitted periodically through the PUCCH, but may be transmitted through the PUSCH when the control information and traffic data are to be transmitted simultaneously. Further, the UCI may be transmitted aperiodically through the PUSCH according to a request/instruction of the network.

FIG. 6 illustrates one example of an architecture of a radio frame in 3GPP LTE/LTE-A to which the present invention may be applied.

A radio frame means a unit of data exchanged and carried by various protocols or a unit of exchanging data, and may be referred to as a PDU.

In a cellular OFDM wireless packet communication system, uplink/downlink data packet transmission is performed by the unit of a subframe and one subframe is defined as a predetermined time interval including multiple OFDM symbols. A 3GPP LTE/LTE-A standard supports radio frame structure type 1 applicable to frequency division duplex (FDD) and radio frame structure type 2 applicable to time division duplex (TDD). According to the FDD scheme, uplink transmission and downlink transmission are performed while occupying different frequency bands. According to the TDD scheme, uplink transmission and downlink transmission are performed while occupying different frequency bands. A channel response of the TDD scheme is substantially reciprocal. This means that a downlink channel response and an uplink channel response are almost the same in a given frequency domain. Therefore, in a TDD-based wireless communication system, it is advantageous in that the downlink channel response may be obtained from the uplink channel response. In the TDD scheme, downlink transmission by the BS and uplink transmission by the UE may not be simultaneously performed since the uplink transmission and the downlink transmission are time-divisional in the entire frequency band. In the TDD system in which the uplink transmission and the downlink transmission are divided by the unit of the subframe, the uplink transmission and the downlink transmission are performed in different subframes.

FIG. 6(a) above illustrates an architecture of radio frame type 1. A downlink radio frame is constituted by 10 subframes and one subframe is constituted by two slots in the time domain. A time required for transmitting one subframe is referred to as a transmission time interval (TTI). For example, a length of one subframe may be 1 ms and the length of one slot may be 0.5 ms. One slot includes a plurality of orthogonal frequency division multiplexing (OFDM) symbols in the time domain and includes a plurality of resource blocks (RBs) in the frequency domain. Since the 3GPP LTE/LTE-A uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

The number of OFDM symbols included in one slot may vary according to a configuration of a cyclic prefix (CP). The CP includes an extended CP and a normal CP. For example, when the OFDM symbol is configured by the normal cyclic prefix, the number of OFDM symbols included in one slot may be seven. When the OFDM symbol is configured by the extended cyclic prefix, since the length of one OFDM symbol increases, the number of OFDM symbols included in one slot is smaller than that of the normal cyclic prefix. In the case of the extended cyclic prefix, for example, the number of OFDM symbols included in one slot may be six. If a channel condition is unstable like a case where the UE moves at a high speed, the extended cyclic prefix may be used to further reduce intersymbol interference.

When the normal cyclic prefix is used, one slot includes 7 OFDM symbols, so one subframe includes 14 OFDM symbols. In this case, first maximum three OFDM symbols of each subframe may be allocated to the physical downlink control channel (PDCCH) and the remaining OFDM symbols may be allocated to the physical downlink shared channel (PDSCH).

FIG. 6(b) above illustrates frame structure type 2. Radio frame type 2 is constituted by two half frames, each half frame is constituted by five subframes, and one subframe is constituted by two slots. In particular, a special subframe among five subframes is constituted by a downlink pilot time slot (DwPTS), a guard period (GP), and an uplink pilot time slot (UpPTS). The DwPTS is used for initial cell search, synchronization, or channel estimation in the UE. The UpPTS is used to match the channel estimation at the BS and uplink transmission synchronization of the UE. The guard period is a period for eliminating interference caused in the uplink due to a multi-path delay of a downlink signal between the uplink and the downlink.

The architecture of the radio frame is merely an example and the number of subframes included in the radio frame or the number of slots included in the subframe and the number of symbols included in the slot may be variously changed.

FIG. 7 is a diagram exemplifying a resource grid for one downlink slot in a wireless communication system to which the present invention may be applied.

Referring to FIG. 7 above, one downlink slot includes the plurality of OFDM symbols in the time domain. Here, it is exemplarily described that one downlink slot includes 7 OFDM symbols, and one resource block includes 12 subcarriers in the frequency domain, but the present invention is not limited thereto.

Each element on the resource grid is referred to as a resource element (RE) and one resource block includes 12×7 resource elements. The resource element on the resource grid may be identified by an in-slot index pair (k, l). Here, k (k=0, . . . , NRB×12−1) represents a frequency-domain internal carrier index and l (l=0, . . . , 6) represents an in-time domain OFDM symbol index. The number NRB of resource blocks included in THE downlink slot depends on a downlink transmission bandwidth. The structure of the uplink slot may be the same as the structure of the downlink slot.

FIG. 8 illustrates an architecture of a downlink subframe in a wireless communication system to which the present invention may be applied.

Referring to FIG. 8, a maximum of first three OFDM symbols in a first slot in the subframe are control regions in which control channels are allocated and the remaining OFDM symbols are data regions in which PDSCHs are allocated. Examples of downlink control channels used in 3GPP LTE/LTE-A include PCFICH, PDCCH, PHICH, and the like.

The PCFICH is transmitted in the first OFDM symbol of the subframe and carries information on the number (i.e., a size of the control region) of OFDM symbols used for transmission of the control channels in the subframe. The PHICH is a response channel to the uplink and carries an ACK/NACK signal for the HARQ. Control information transmitted through the PDCCH is referred to as downlink control information (DCI). The downlink control information includes uplink resource allocation information, downlink resource allocation information, or an uplink transmission (Tx) power control command for an arbitrary UE group.

The BS determines a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for specific UE. Alternatively, in the case of the PDCCH for the paging message, the CRC may be masked with a paging indication identifier (e.g., paging-RNTI (P-RNTI)). In the case of the PDCCH for a system information block (SIB), the CRC may be masked with a system information-RNTI (SI-RNTI). Further, the CRC may be masked with a random access-RNTI (RA-RNTI) in order to indicate a random access response which is a response to transmission of a random access preamble of the UE.

FIG. 9 illustrates an architecture of an uplink subframe in a wireless communication system to which the present invention may be applied.

Referring to FIG. 9, the uplink subframe may be divided into the control region and the data region in the frequency domain. The PUCCH carrying the uplink control information is allocated to the control region. The PUSCH carrying the user data is allocated to the data region. When the data region is indicated by the upper layer, the UE may support simultaneous transmission of the PUSCH and the PUCCH. The resource block pair within the subframe is allocated to the PUCCH for one UE. The resource blocks which belong to the resource block pair allocated to the PUCCH occupy different subcarriers in two slots, respectively based on a slot boundary. In this case, the resource block pair allocated to the PUCCH frequency-hops in the slot boundary.

Physical Downlink Control Channel (PDCCH)

Control information transmitted through the PDCCH is referred to as a downlink control indicator (DCI). The size and the purpose of the control information vary according to the DCI format and the PDCCH may vary in size according to a coding rate.

Table 1 shows the DCI depending on the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |

TABLE 1-continued

| DCI format | Objectives |
|---|---|
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI includes format, format 0 for PUSCH scheduling, format 1 for scheduling one PDSCH codeword, format 1A for compact scheduling of one PDSCH codeword, format 10 for simple scheduling, format 2 for PDSCH scheduling in a closed-loop spatial multiplexing mode, format 2A for PDSCH scheduling in an open loop spatial multiplexing mode, formats 3 and 3A for transmission of a transmission power control (TPC) command, and format 4 for PUSCH scheduling in one uplink cell in a multi-antenna port transmission mode.

DCI format 1A may be used for PDSCH scheduling regardless of which transmission mode is set in the UE.

Such DCI format may be independently applied for each UE and the PDCCHs of multiple UE in one subframe may be simultaneously multiplexed.

The PDCCH is configured by one control channel element or an aggregation of several consecutive control channel elements (CCEs). The CCE is a logical allocation unit used to provide the PDCCH with the coding rate according to a state of a radio channel. The CCE is a unit corresponding to nine sets of REGs consisting of four resource elements. The BS may use {1, 2, 4, 8} CCEs in order to configure one PDCCH signal and {1, 2, 4, 8} in this case is called a CCE aggregation level.

The number of CCEs used for transmission of a specific PDCCH is determined by the BS according to the channel state. The PDCCH configured according to each UE is interleaved and mapped into a control channel region of each subframe according to a CCE-to-RE mapping rule. The location of the PDCCH may vary depending on the number of OFDM symbols for the control channel of each subframe, the number of PHICH groups, a transmission antenna, and a frequency transition.

As described above, channel coding is independently performed on the PDCCH of each multiplexed UE and the cyclic redundancy check (CRC) is applied. The CRC is masked with a unique identifier (UE ID) of each UE to allow the UE to receive the PDCCH thereof. However, in the control region allocated in the subframe, the BS does not provide information on where the corresponding PDCCH is located to the UE.

Since the UE may not know at which position, at which CCE aggregation level or DCI format the PDCCH of the UE is transmitted in order to receive the control channel transmitted from the BS, the UE monitors an aggregation of PDCCH candidates in the subframe to find the PDCCH of the UE. This is called blind decoding (BD). The blind decoding may be referred to as blind detection or blind search. The blind decoding refers to a method in which the UE de-masks the CRC part with the UE ID and then checks a CRC error to verify whether the corresponding PDCCH is the control channel of the UE.

Hereinafter, an RRC state and an RRC connection method of the UE will be described.

The RRC state refers to whether the RRC layer of the UE is logically connected with the RRC layer of the E-UTRAN and a case where the RRC layer of the UE is connected with the RRC layer of the RRC layer of the E-UTRAN is called an RRC connected state and a case where the RRC layer of the UE is not connected with the RRC layer of the E-UTRAN is called an RRC idle state. Since the RRC connection exists in the UE in the RRC connected state, the E-UTRAN may determine the existence of the corresponding UE by the unit of the cell, thereby effectively controlling the UE.

On the contrary, the UE in the RRC idle state may not be determined by the E-UTRAN and is managed by the unit of a tracking area which is a larger region unit than the cell by a core network (CN). That is, it is determined only whether the UE in the RRC idle state exists by the unit of the larger region and the UE in the RRC idle state needs to move to the RRC connected state in order to receive a normal mobile communication service such as voice and data.

When a user first turns on a power of the UE, the UE first searches an appropriate cell and then stays in the RRC idle state in the corresponding cell. When the UE in the RRC idle state needs to establish an RRC connection, the UE in the RRC idle state establishes the RRC connection with the E-UTRAN through an RRC connection procedure and transitions to the RRC connection state. There are multiple cases where the UE in the RRC idle state needs to establish the RRC connection and for example, uplink data transmission is required due to a call attempt of the user or a paging message is received from the E-UTRAN, the case may correspond to response message transmission thereto.

A non-access stratum (NAS) layer positioned above the RRC layer performs such as session management and mobility management.

In the NAS layer, two states of EPS mobility management-registered (EMM-REGISTERED) and EMM-deregistered are defined in order to management the mobility of the UE and the two states are applied to the UE and the MME. Initial UE is in the EMM-deregistered state and the UE performs a process of registering the UE in the corresponding network through an initial attach procedure in order to access the network. When the attach procedure is successfully performed, the UE and the MME are in the EMM-registered state.

Two states of an EPS connection management (ECM)-IDLE state and an ECM-CONNECTED state are defined in order to manage signaling connection between the UE and the EPC and the two states are applied to the UE and the MME. When the UE in the ECM-IDLE state establishes the RRC connection with the E-UTRAN, the corresponding UE becomes in the ECM-connected state.

When the MME in the ECM-idle state establishes the S1 connection with the E-UTRAN, the MME becomes in the ECM-connected state. When the UE is in the ECM-IDLE state, the E-UTRAN has no context information of the UE. Accordingly, the UE in the ECM-idle state performs a UE-based mobility-related procedure such as cell selection or cell reselection without receiving the command of the network. On the contrary, when the UE is in the ECM-connected state, the mobility of the UE is managed by the command of the network. When the position of the UE in the ECM-idle state is different from a position known by the network, the UE notifies the corresponding position of the UE to the network through a tracking area update procedure.

Next, the system information will be described.

The system information includes essential information which the UE needs to know in order to access the BS. Therefore, the UE needs to all of the system information before accessing the BS and further, needs to continuously latest system information. In addition, since the system information is information which all UE in one cell needs to know, the BS periodically transmits the system information.

According to Section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the cell, for example, a bandwidth. The SB informs transmission information of the SIBs, for example, a transmission period. The SIB is a collection of the system information related to each other. For example, some SIBs only contain only information of an adjacent cell and some SIBs contain only information of the uplink radio channel used by the UE.

FIG. 10 is a flowchart illustrating a process of establishing RRC connection to which the present invention may be applied.

The UE transmits an RRC connection request message for requesting the RRC connection to the network (S10010). The network transmits an RRC connection setup message as a response to the RRC connection request (S10020). The UE enters an RRC connection mode after receiving the RRC connection setup message.

The UE transmits to the network an RRC connection setup complete message used for verifying successful completion of RRC connection establishment (S10030).

FIG. 11 is a flowchart illustrating an RRC connection reconfiguration process to which the present invention may be applied.

RRC connection reconfiguration is used to modify the RRC connection. This is used for establishment/modification/release, handover execution, measurement setup/modification/release of the radio bearer (RB).

The network transmits an RRC connection reconfiguration message for modifying the RRC connection to the UE (S11010). The UE transmits to the network an RRC connection reconfiguration complete message used for verifying successful completion of RRC connection reconfiguration as a response to the RRC connection reconfiguration (S11020).

Uplink Resource Allocation Procedure

In the 3GPP LTE/LTE-A system, a scheduling-based data transmission/reception method of the BS is used to maximize utilization of resources. This means that when there is data to be transmitted by the UE, the BS may firstly request the uplink resource allocation to the BS and transmit data using only the uplink resources allocated from the BS.

FIG. 12 is a diagram exemplifying an uplink resource allocation process of a UE in a wireless communication system to which the present invention may be applied.

In order to efficiently use the uplink radio resource, the BS needs to know what types of data and how much data is to be transmitted on the uplink for each UE. Accordingly, the UE may directly transmit information on uplink data to be transmitted to the BS and the BS may allocate the uplink resource to the UE based on the information. In this case, the information on the uplink data transmitted from the UE to the BS is referred to as a buffer status report (BSR) as the amount of the uplink data stored in a buffer. The BSR is transmitted using a MAC control element when the UE is allocated resources on the PUSCH in the current TTI and a reporting event is triggered.

FIG. 12(a) above illustrates an uplink resource allocation process for actual data when an uplink radio resource for buffer status reporting (BSR) is not allocated to the UE. That is, since a UE switching a state of an active mode in a DRX mode has no data resource which is allocated in advance, the UE needs to request the resource for the uplink data starting from SR transmission through the PUCCH and in this case, an uplink resource allocation procedure of 5 steps is used.

Referring to FIG. 12(a) above, when a PUSCH resource for transmitting the BSR is not allocated to the UE, the UE first transmits the scheduling request (SR) to the BS in order to allocate the PUSCH resource (S12010).

A reporting event occurs in the scheduling request, but when the UE does not schedule the radio resource onto the PUSCH at a current TTI, the scheduling request is used for the UE to request the PUSCH resource in order to be allocated the PUSCH resource for uplink transmission.

That is, the UE transmits the SR on the PUCCH when a regular BSR is triggered but does not have the uplink radio resource for transmitting the BSR to the BS. The UE transmits the SR through the PUCCH or initiates the random access procedure according to whether the PUCCH resource for the SR is configured. Specifically, the PUCCH resource in which the SR may be transmitted is configured by the upper layer (e.g., RRC layer) in a UE-specific manner. The SR configuration includes SR periodicity and SR offset information.

When receiving a UL grant for the PUSCH resource for the BSR transmission from the BS (S12020), the UE transmits the BSR triggered through the PUSCH resource allocated by the UL grant to the BS (S12030).

The BS checks the amount of data to be transmitted on the uplink by the actual BS through the BSR and transmits the UL grant for the PUSCH resource for the actual data transmission to the UE (S12040). The UE receiving the UL grant for the actual data transmission transmits actual uplink data to the BS through the allocated PUSCH resource (S12050).

FIG. 12(b) above exemplifies an uplink resource allocation process for actual data when the uplink radio resource for the BSR is allocated to the UE.

Referring to FIG. 12(b) above, when the PUSCH resource for transmitting the BSR is already allocated to the UE, the UE transmits the BSR through the allocated PUSCH resource and transmits the scheduling request to the BS together with the BSR (S12110). Next, the BS verifies the amount of data which the actual UE is to transmit on the uplink through the BSR and transmits the UL grant for the PUSCH resource for the actual data transmission to the UE (S12120). The UE receiving the UL grant for the actual data transmission transmits the actual uplink data to the BS through the allocated PUSCH resource (S12130).

Random Access Procedure (RACH Procedure)

FIG. 13 illustrates one example of a random access procedure in an LTE system.

The random access procedure is performed at the initial access in the RRC_IDLE, the initial access after the radio link failure, handover requesting the random access procedure, and the uplink or downlink data generation requiring the random access procedure during the RRC_CONNECTED. Some RRC messages including an RRC connection request message, a cell update message, an UTRAN registration area (URA) update message, and the like are also transmitted by using the random access procedure. A logical channel common control channel (CCCH), a dedicated control channel (DCCH), and a dedicated traffic channel (DTCH) may be mapped to a transport channel RACH. The transport channel RACH is mapped to a physical random access channel (PRACH).

When the MAC layer of the UE instructs a UE physical layer to transmit the PRACH, the UE physical layer first selects one access slot and one signature and transmits A PRACH preamble to the uplink. The random access procedure is divided into a contention-based random access procedure and a non-contention based random access procedure.

FIG. 13(a) above illustrates an example of a contention based random access procedure and FIG. 13(b) above illustrates an example of a non-contention based random access procedure.

First, the contention-based random access procedure will be described with reference to FIG. 13(a) above.

The UE receives and stores information on the random access from the BS through the system information. Thereafter, when the random access is required, the UE transmits a random access preamble (also referred to as message 1) to the BS (S13010).

When the BS receives the random access preamble from the UE, the BS transmits a random access response message (also referred to as message 2) to the UE (S13020). Specifically, downlink scheduling information for the random access response message may be CRC-masked with a random access-radio network temporary identifier (RA-RNTI) and transmitted on an L1 or L2 control channel (PDCCH). The UE receiving the downlink scheduling signal masked with the RA-RNTI may receive and decode the random access response message from a physical downlink shared channel (PDSCH). Thereafter, the UE checks whether the random access response information indicated to the UE exists in the random access response message.

Whether there is the random access response information indicated to the UE may be confirmed by whether there is a random access preamble ID (RAID) for the preamble transmitted by the UE.

The random access response information includes timing alignment (TA) indicating timing offset information for synchronization, radio resource allocation information used in the uplink, temporary ID (e.g., temporary C-RNTI) for terminal identification, and the like.

When receiving the random access response information, the UE performs uplink transmission (also referred to as message 3) on the uplink shared channel (S-SCH) according to the radio resource allocation information included in the response information (S 13030). Here, the uplink transmission may be expressed as scheduled transmission.

After receiving the uplink transmission from the UE, the BS transmits a message (also referred to as message 4) for contention resolution to the UE through a downlink shared channel (DL-SCH).

First, the non-contention based random access procedure will be described with reference to FIG. 13(b) above.

Before the UE transmits the random access preamble, the BS allocates a non-contention random access preamble to the UE (S13110).

The non-contention random access preamble may be allocated through a handover command or dedicated signaling such as the PDCCH. When the UE is allocated the non-contention random access preamble, the UE transmits the non-contention random access preamble allocated to the BS (S13120).

Thereafter, the BS may transmit the random access response (also referred to as message 2) to the UE similar to step S2002 in the contention based random access procedure (S13130).

In the random access procedure described above, the HARQ is not applied to the random access response, but the HARQ may be applied to a message for uplink transmission or contention resolution for the random access response. Therefore, the UE does not need to transmit the ACK or NACK for the random access response.

Next, a UL data transmission method in LTE(-A) or 802.16 will be described in brief.

A cellular system such as an LTE(-A) system or an 802.16m system uses a BS scheduling-based resource allocation scheme.

A UE having data (i.e., UL data) to be transmitted in a system using the BS scheduling-based resource allocation scheme requests to the BS a resource for the corresponding data transmission before transmitting data.

Such a scheduling request by the UE may be performed through scheduling request (SR) transmission to the PUCCH or buffer status report (BSR) transmission to the PUSCH.

In addition, when resources to transmit the SR or BSR are not allocated to the UE, the UE may request the uplink resource to the BS through an RACH procedure.

The BS that receives the scheduling request from the UE allocates the uplink resource to be used by the corresponding UE to the UE through a downlink control channel (i.e., an UL grant message and a DCI for LTE(-A)).

In this case, the UL grant transmitted to the UE may be notified by explicitly signaling to which subframe resource the resource allocated to the UE corresponds, but the resource is allocated to a subframe after a specific time (e.g., 4 ms in the case of the LTE) to define an appointed time between the UE and the BS.

As described above, allocating, by the BS, the resources after Xms (e.g., 4 ms in the case of the LTE(-A)) to the UE means allocating, by the UE, the resources of the UE by considering both a time of receiving and decoding the UL grant and a time of preparing and encoding the data to be transmitted.

EMM and ECM States

EPS mobility management (EMM) and EPS connection management (ECM) states will be described.

FIG. 14 is a diagram exemplifying EMM and ECM states in a wireless communication system to which the present invention may be applied.

Referring to FIG. 14 above, in order to manage the mobility of the UE in the NAS layer located on the control planes of the MME and the UE, an EMM registered state and an EMM-deregistered state may be defined according to whether the UE is attached to or detached from the network. The EMM registered state and the EMM-deregistered state may be applied to the UE and the MME.

Like a case where the UE initially turns on the power, the initial UE is in the EMM-DEREGISTERED state and the UE performs a process of registering the UE in the corresponding network through the initial attach procedure in order to access the network. When the attach procedure is successfully performed, the UE and the MME are transitioned to the EMM-registered state. In addition, when the UE is powered off or the radio link is unsuccessful (when a packet error rate exceeds a reference value on the radio link), the UE is detached from the network and transitioned to the EMM-deregistered state.

Further, an ECM connected state and an ECM idle state may be defined in order to manage the signaling connection between the UE and the network. The ECM connected state and the ECM idle state may also be applied to the UE and the MME.

Further, the RRC state between the UE and the BS indicates whether the RRC layer of the UE and the RRC layer of the BS are logically connected. That is, when the RRC layer of the UE and the RRC layer of the BS are connected, the UE is in the RRC_CONNECTED state.

When the RRC layer of the UE and the RRC layer of the BS are not connected, the UE is in the RRC_IDLE state.

Form in which ECM State is Linked with RRC State

The ECM connection is constituted by the RRC connection configured between the UE and the BS and the S1 signaling connection established between the BS and the MME. That is, the ECM connection is configured/cancelled means that both the RRC connection and the S1 signaling connection are configured/cancelled.

The network may grasp the existence of the UE in the ECM connected & RRC connected state in a cell unit and effectively control the UE.

On the contrary, the network may not determine the existence of the UE in the ECM idle state and is managed by the unit of the tracking area which is the larger region unit than the cell by a core network (CN). When the UE is in the ECM idle state, the UE performs discontinuous reception (DRX) configured by the NAS using an ID uniquely allocated in the tracking area. That is, the UE may receive broadcasts of system information and paging information by monitoring the paging signal at a specific paging time for each UE-specific paging DRX cycle.

Further, when the UE is in the ECM idle state, the network has no context information of the UE. Accordingly, the UE in the ECM idle state performs a UE-based mobility-related procedure such as cell selection or cell reselection without receiving the command of the network. When the position of the UE in the ECM idle state is different from the position known by the network, the UE notifies the corresponding position of the UE to the network through a tracking area update (TAU) procedure.

On the contrary, when the UE is in the ECM connected & RRC connected state, the mobility of the UE is managed by the command of the network. The network knows the cell to which the UE belongs in the ECM connected & RRC connected state. Thus, the network may transmit and/or receive data to/from the UE, control mobility such as UE handover, and perform cell measurements for the adjacent cell.

As described above, in order for the UE to receive a normal mobile communication service such as voice or data, the UE needs to be transitioned to the ECM connected & RRC connected state. The initial UE is in the ECM idle state similar to the EMM state as in the case where the UE is first turned on and when the UE is successfully registered in the corresponding network through the initial attach procedure, the UE and the MME are transitioned to the ECM connected state. Further, when the UE is registered in the network but the traffic is inactivated and the radio resource is not thus allocated, the UE is in the ECM idle state and when new uplink or downlink traffic is generated in the UE, the UE and the MME is transitioned to the ECM connected state.

Form in which ECM State is not Linked with RRC State

The ECM connection is constituted by the RRC connection established between the UE and the BS and the S1 signaling connection established between the BS and the MME, but may be irrespective of the RRC state. That is, even though the RRC state is transitioned from the connection state to the idle state, the ECM state between the UE and the MME may maintain the connection state.

The operations of the network/BS and the UE in the ECM-CONNECTED & RRC-CONNECTED state and the ECM-IDLE state may be the same as that in the state in which the ECM state is linked with the RRC state described above.

The network in the ECM-CONNECTED & RRC-IDLE state is performed in the same manner as the operation in the ECM-CONNECTED state, and may manage the mobility of the terminal in a specific unit of the BS and the UE and reconfigure a route of connection (e.g., S1 signaling connection and S2 data connection) with the MME/S-GW.

Therefore, the UE may perform other operations according to a state thereof as follows.

ECM-IDLE

Transmission of messages for ECM and RRC connection state transitions

ECM-CONNECTED & RRC-IDLE (Except RRC-IDLE of UE due to radio link failure): Message transmission for RRC connection state transition and connection resumption ECM-CONNECTED & RRC-IDLE (RRC-IDLE of UE due to radio link failure): Message transmission for RRC connection reconfiguration Next, an example of a wireless communication system architecture for supporting a next-generation RAN to which methods proposed by the present specification may be applied will be described with reference to FIGS. 15 to 17.

FIG. 15 is a diagram illustrating one example of a wireless communication system architecture for supporting a next-generation RAN to which methods proposed by the present specification may be applied.

The wireless communication system structure for supporting the next-generation RAN may be expressed as a 'high level architecture'.

A next generation may be briefly expressed as "Next Gen" or the like and the next generation may collectively refer to terms referring to future communication generations including 5G and the like.

For easy description, the next generation will hereinafter be referred to as "Next Gen".

The structure of the "Next Gen" may support new RAT(s), evolved LTE, and non-3GPP access types.

Examples of the non-3GPP access types may include WLAN access, Fixed access, and the like.

In addition, the "Next Gen" structure supports a unified authentication framework for other access systems and supports simultaneous connection with multiple UE through multiple access technologies.

In addition, the "Next Gen" structure allows independent evolution of the core network and RAN and minimizes access dependency.

In addition, the "Next Gen" structure supports separation of control plane and user plane functions and supports transmission of IP packets, non-IP PDUs, and Ethernet frames.

Referring to FIG. 15, the "Next Gen" structure may include NextGen UE 1510, NextGen RAN 1520, NextGen Core 1530, and Data network 1540.

Here, in the wireless communication system of the "Next Gen", the UE may be expressed as 'NextGen UE', the RAN defining the radio protocol structure between the UE and the BS may be expressed as 'NextGen RAN', and the core network may be expressed as 'NextGen Core'.

As an example, 'NextGen RAN' may correspond to E-UTRAN in the LTE(-A) system, 'NextGen Core' may correspond to EPC in the LTE(-A) system, and network entities performing functions including MME, S-GW, P-GW, etc., in the LTE EPC may also be included in the NextGen Core.

An NG1-C interface and an NG1-U interface exist between the NextGen RAN and the NextGen Core and an NG-Gi interface exists between the NextGen Core and the Data Network.

Here, NG1-C represents a reference point for the control plane between the NextGen RAN and the NextGen Core and NG1-U represents a reference point for the user plane between the NextGen RAN and the NextGen Core.

Although not illustrated in FIG. 15 above, NG-NAS represents a reference point for the control plane between the NextGen UE and the NextGen Core.

Further, NG-Gi represents a reference point between the NextGen Core and the data network.

Here, the data network may be an operator external public network or a private data network or an intra-operator data network.

FIG. 16 is a diagram illustrating one example of a flow based QoS architecture to which the methods proposed by the present specification may be applied.

In particular, FIG. 16 specifically illustrates the interface between UE, AN, and AF in detail by dividing the NextGen Core of FIG. 15 above into a control plane (CP) function and a user plane (UP) function.

Referring to FIG. 16, a flow-based QoS handling method will be described in more detail.

Referring to FIG. 16, a policy of a quality of service (QoS) in a wireless communication system to which the present invention is applied may be stored and configured in a control plane (CP) function 16030 for the following reasons.

Application in a user plane (UP) function 29040
transmission in admission control (AN) 29020 and UE 16010

Hereinafter, parameters for defining the QoS framework will be described.

Flow Priority Indicator (FPI): represents a parameter for defining a priority of each flow process in UP functions 16040 and AN functions 16020. This corresponds to a scheduling priority and a priority in a congestion case.

Further, the FPI indicates whether the flow requires a guaranteed flow bit rate and/or a maximum flow bit rate.

Flow Descriptor: Packet filters related with a specific flow process. Identification in the uplink needs to be performed in the UE and the AN 1020, but is limited to layer 3 and layer 4.

Maximum Flow Bitrate (MFB): parameter indicating uplink and downlink bit rate values which may be applied for one flow or a combination of flows.

The parameter represents a maximum authorized bit rate authorized for a data flow.

Flow Priority Level (FPL): Parameter for defining a static significance of the flow for accessing the AN (16020) resource. Additionally, the FPL indicates whether to access an AN (16020) non-prioritized resource. The AN non-prioritized resource needs to be an allocated resource that is either pre-emptable or protected from pre-emption.

Session Bitrate: parameter indicating the bit rate value in the uplink and downlink for establishing a user session. The Session Bitrate parameter represents the maximum bit rate allowed for the user session.

The support of the GFP in the UE depends on a QoS design of the radio interface.

As illustrated in FIG. 29 above, the CP functions and the UP functions are functions included in the NextGen CN (indicated by a dotted line) and may be implemented by one physical device or by different physical devices.

FIG. 17 is a diagram illustrating one example of a QoS architecture used in a QoS framework to which the methods proposed by the present specification may be applied.

Content Requirement Awareness Function in the Core (CAF-Core)

The CAF-Core 17030 supports a mechanism for identifying application sessions (e.g., downloading video, downloading web pages, listening to music, posting for a social media network, etc.) and enforcing QoS policies associated with the discovered applications.

The CAF-Core receives the QoS policies from a Core CP. Application discovery is accomplished by means of non-standardized algorithms (e.g., usage patterns, heuristics, SNF discovery for encrypted traffic, etc.).

The CAF performs QoS enforcement on the CN based on the QoS policies received from the Core Cp.

The CAF-Core may handle the QoS policies and obtain dynamic QoS targets and local enforcement actions in the CN.

In addition, the CAF-Core may update the dynamic QoS targets and the local enforcement actions in real time based on current content requirements of user plane traffic mix, simultaneous competing flows, and network status and resource availability within the limits of the QoS policies provided by the NG Core CP functions. As such, the CAF-Core enforces the QoS policies within the given policy limits and will not deviate out of any range.

Content Requirement Awareness Function in the RAN (CAF-RAN)

The CAF-RAN 17010 supports a mechanism for identifying the application sessions (e.g., downloading video, downloading web pages, listening to music, posting for a social media network, etc.) and enforcing the QoS policies.

The CAF-RAN receives the QoS policies from the Core CP. The CAF-RAN may use the application discovery information provided by the Core, the application discovery information may imply additional specific requirements for a certain application session, and at the same time, may form traffic for a given session. The CAF-RAN performs QoS enforcement based on the QoS policies received from the Core CP. This includes traffic forming for DL and UL. The DL traffic forming helps control the flow of UL traffic.

The CAF-RAN may handle the QoS policies and obtain the dynamic QoS targets and local enforcement actions in the RAN. In addition, the CAF-RAN may update the dynamic QoS targets and the local enforcement actions in real time based on the current content requirements of user plane traffic mix, simultaneous competing flows, and network status and resource availability within the limits of the QoS policies provided by the NG Core. As such, the CAF-RAN enforces the QoS policies within the given policy limits and will not deviate out of any range.

The RAN is limited by the charging performed in the core and thus has no effect on the charging performed in the UP function in the core. The amount of specific traffic charged by the core is provided to the RAN in conjunction with packet marking with application marking and the CAF-RAN enforces and conserves the charged capacity in relation to the bits.

Coordination Between CAF-Core and CAF-RAN

The CAF-Core may perform the application discovery and provide information in the form of the packet marking based on the policies received from the CN CP.

The traffic forming and the policy enforcement in the CAF-RAN are limited by the packet marking represented by the policies received from the CAF-Core and the CN CP. This helps the CAF-Core and the CAF-RAN to operate in a cooperative manner and the charging is also performed for the application represented by the CAF-Core.

Next, the CN CP function and the CN UP function will be described.

The CN CP function and the CN UP function may be implemented by one physical device or respective physical devices.

CN CP Function

The QoS policies are stored in the CN CP Functions. In session formation, Subscriber and application specific policies are transmitted to the RAN and the CAF which exists in the CN UP function.

CN UP Function

In the core, the UP function is responsible for traffic charging support (CDR, granted quota for on-line) based on policies that take into account an outcome of the CAF. Further, the CN UP function marks downlink traffic transmitted to the RAN.

Policy Provisioning and Enforcement

The operator supplies specific QoS policies to the subscribers and applications of the NG Core Cp function. The CP function of the Core provides the policies to the RAN and CN UP functions.

The enforcement actions are obtained from the policy points according to the current content requirements of the user plane traffic mix, simultaneous competing flows, and network status and resource availability.

Charging

Traffic charging (30020) support (CDR, granted quota for on-line) based on policies that take into account an outcome of the CAF is performed in the CN UP function.

Multiple Levels of Policies

The following shows different configurations of the QoS policies provided by the UP functions and the RAN.

Intent level QoS policies that show the configuration of floors may be identified by the packet marking, SDF descriptor, and the like in an abstract QoS target (e.g., Voice type Qos, Smoothed Bit rate Qos (limit the bandwidth variation for the traffic), bulk traffic (when a radio condition is bad or a load on the cell is excessive, the traffic may be discarded)).

Transmission QoS level policies that show the configuration of the floor may be identified by the packet marking, the SDF descriptors, etc. in explicit QoS targets (priority, delay, jitter, etc.).

The CP functions of the CAF-RAN and the CAF-Core are responsible for local CAF policies and Transport locally map Intent level QoS policies which belong to QoS level policies based on local (radio) conditions (current context of user plane traffic mix, simultaneous competing flows and network status and resource availability) and are limited by upper limits of Intent level QoS policies.

Parameters Required for QoS Framework

The following parameters are required for defining the QoS framework.

Policy description:

Scope of definition: Application name or application type

Definition of Intent: High Definition experience for RT Multimedia or explicit QoS target level (e.g., 150 ms maximum packet delay for IMS video)

Maximum Flow Bitrate: UL and DL bit rate values that may be applied for a single PDU session or a combination of PDU sessions for given UE.

Allocation and Retention Priority level (ARP): A priority level that indicates the per-emption capability and the pre-emption vulnerability for a given PDU session.

FIG. 18 is a flowchart illustrating one example of data transmission through a contention based resource region to which the present invention may be applied.

Referring to FIG. 18, the UE simultaneously transmits a message such as a resource request message or a random access request message through a contention based resource region to allow the BS to allocate uplink resources according to the required quality characteristics and size included in the corresponding message. Alternatively, the UE may transmit an uplink message for state transition, connection reconfiguration, etc. through the contention based resource region.

Specifically, the contention based resource region refers to a resource region capable of transmitting the message to the BS regardless of the state of the UE. That is, the contention based resource region refers to a resource region capable of transmitting the message regardless of separate scheduling.

The UE transmits a preamble and a random access request message for random access to the BS through the contention based resource region (S18010).

The UE transmits the random access request message to request resource allocation for transmitting the uplink message to the BS. In this case, the random access request message may include a required quality characteristic and size information for requesting the resource allocation.

The BS receives the random access preamble and the random access request message, allocates the uplink resource according to the required quality characteristic and size included in the random access request message, and transmits information on the allocated uplink resource included in the random access response message to the UE (S18020).

Thereafter, the UE may transmit the uplink message to the BS through the resources allocated from the BS. FIGS. 19 and 20 are diagrams illustrating one example of a structure of a contention based resource region to which the present invention may be applied.

Referring to FIGS. 19 and 20, a preamble transmission region for transmitting the preamble and a message transmission region for transmitting the message in the contention based resource region may be adjacent or physically separated from each other.

Specifically, FIGS. 19(a) to 19(d) illustrate the preamble transmission region and the message transmission region which are adjacent to each other. In FIGS. 19(a) and 19(b), the preamble transmission region and the message transmission region are adjacent to each other along a frequency axis and in FIGS. 19(c) and 19(d), the preamble transmission region and the message transmission region are adjacent to each other along a time axis.

FIGS. 20(a) to 20(d) illustrate the preamble transmission region which is physically separated and the message transmission region positioned therebetween. FIGS. 20(a) and 20(b) illustrate the preamble transmission region which is separated along the frequency axis and the message transmission region positioned between the preamble transmission regions.

FIGS. 20(c) and 20(d) illustrate the preamble transmission region which is separated along the frequency axis and the message transmission region adjacent on the time axis.

The information of the preamble transmission region and the message transmission region illustrated in FIGS. 19 and 20, that is, resource block allocation information, is included in system information and transmitted to the UE.

The system information may include resource block allocation information indicating at which frequency and time the preamble transmission region and/or the message transmission region are/is allocated, modulation and coding scheme information, information on the total number of message transmission regions, information on an allocation period (e.g., how many radio frames/subframes are allocated), and the like.

FIG. 21 is a diagram illustrating one example of a modification of system information to which the present invention may be applied.

When the network modifies all or some of the system information, the network first notifies to the UE that the system information is modified. That is, when the modification of the system information is notified within a modification period, the network transmits modified (or updated) system information to the UE in a next modification period.

In FIG. 21, different shades indicate different system information. Upon receiving the modification notification of the system information, the UE immediately obtains the modified system information from the start of the next modification period. The UE applies previously acquired system information until the UE obtains the modified system information.

A paging message is used to notify the UE in the RRC idle mode and the UE in the RRC connected mode about the modification of the system information.

When the UE receives a paging message that includes a systemInforModification field, the UE is informed that the system information is modified at a next modification period boundary. However, even if the UE receives information on the modification in the system information, the UE may not know detailed information such as which system information is modified or the like.

System information block 1 (SIB 1) includes a system InfoValue Tag indicating that the modification occurs in a system information message. The UE may use the system information value tag to verify that the previously stored SI message is still valid (e.g., when the SI message enters coverage beyond coverage). Further, the UE may consider that the stored system information is not valid after a predetermined time from a time when the stored system information is successfully valid.

The network may not update the system information value tag when some system information (e.g., parameters SIB8 and SIB16, and an EAB parameter that are constantly modified, such as ETWS, CAMS information, and time information) is modified. Similarly, the network may not include the systemInfoModification field in the paging message when some system information is modified.

When the system InfoValueTag is checked in the SIB 1 after the modification period boundary or when paging is not received, a system information modification (systemInfoModification) indication is attempted to searched at least as large as modificationPeriodCoeff counts (e.g., 2, 4, 8, and 16) during the modification period every modification period, and as a result, the UE may confirm that the stored system information is valid.

When the UE does not receive the paging message during the modification period, the UE may assume that the system information will not be changed at the next modification period boundary. When the UE in the RRC_CONNECTED mode receives one paging message during the modification period, the UE may determine whether the system information other than the ETWS information, the CMAS information, and the EAB parameter is modified in the next modification period.

UE capable of supporting an ETWS and/or CMAS, which is RRC_CONNECTED attempts to read the paging at least once per every default paging cycle (defaultPagingCycle) to check whether ETWS and/or CMAS notification is present.

The modification period of the system information is expressed by Equation 1 below.

$$\text{Modification period} = \text{modificationPeriodCoeff} \cdot \text{defaultPagingCycle} \quad [\text{Equation 1}]$$

The default paging cycle may have one of {rf32, rf64, rf128, rf356} values and rf32 represents a length of a 32 Radio frame. That is, rf32 may mean 320 ms.

Based on the system information, information on the contention based resource region may be received. When the contention based resource region is modified, information on the modified contention based resource region may be received through the modified system information.

However, as described above, when the system information is modified, it takes a minimum of 320 ms (half of the system information modification period) until the modified system information is reflected and the modified resource allocation information is not reflected during this time.

That is, when the contention based resource region is additionally allocated, contention for the message transmission region is intensified due to reflection delay for additional allocation and data transmission delay occurs.

In addition, when the contention based resource region is released, radio resources may be wasted due to reflection delay for deallocation.

Therefore, the present invention proposes a method that may solve a contention intensification problem while minimizing an influence of overhead of the UE and the network in notifying the UE of the modification of the contention based resource region.

FIG. 22 is a flowchart illustrating one example of a method for transmitting data through configuration information of a contention based resource region to which the present invention may be applied.

Referring to FIG. 22, in order to solve the problem described above, the BS and the UE may perform the following operations.

BS: The BS informs the UE of the modification of the system information in the modification period of the system information and when it is necessary to dynamically change (or modify) the configuration information for the contention based resource region, the BS dynamically modifies the configuration information during the modification period of the system information and transmits the modified configuration information during a modification period of the modified configuration information or a message including the configuration information. UE: The UE receives the system information including the configuration information for allocation of the contention based resource region from the BS to confirm a resource region available in the contention based resource region. Thereafter, when recognizing the modification of the system information (for example, recognizing the modification of the system information through reception of a signal from the BS, etc.), it is monitored whether the configuration information is dynamically modified and in case of receiving the dynamically modified configuration information, it is possible to confirm the availability of the contention based resource region according to the modified configuration information.

Specifically, the UE in the idle state and/or the connected state receives a message including configuration information for the contention based resource region from the BS (S22010).

The UE wakes up in a listening interval and receives the message including the configuration information.

Alternatively, when the UE intends to transmit uplink data in the contention based resource region, the UE awakes at the time when the uplink data is generated and receives the message including the configuration information.

In this case, the message may be a system information message or a specific message for separately transmitting the configuration information.

The configuration information may include configuration information (or region information) indicating the configuration of the contention based resource region and additional information to determine whether the resource of the contention based resource region may be used by the UE.

The additional information may include resource information (first resource information) indicating available resources and resource information (second resource information) indicating unavailable resources.

The configuration information may be updated by the unit of a specific cycle. That is, when the contention based resource region is to be modified (for example, additional allocation or release of the contention based resource region), the configuration information may be modified (or updated) every specific cycle.

The specific cycle may be decided by the allocation period of the contention based resource region and the allocated subframe number set by the system information.

Further, when the configuration information is modified, the modified configuration information is applied from the contention based resource region mapped to the specific cycle in which the modified configuration information is transmitted.

Based on the configuration information, the UE that receives the message including the configuration information may determine the available resources and the unavailable resources of the contention based resource region and transmit the preamble and/the specific message through the available resources (S22020).

When the configuration information is included in the specific message other than the system information, the UE may determine the available resources and the unavailable resources of the contention based resource region through the contention based resource region information included in the system information and the configuration information included in the specific message.

When the preamble and/or the specific message are successfully transmitted, a procedure is terminated.

However, when the preamble and/or the specific message may not be successfully transmitted to the BS, the UE requests the BS to modify the configuration information (for example, additional request of an available contention based resource region).

That is, the BS requests the base station to modify the configurations of the available resources and the unavailable resources in the contention based resource region (S22030).

Thereafter, the UE receives the modified configuration information from the BS, and retransmits the preamble and/or the specific message based on the modified configuration information (S22040).

The UE may receive the configuration information related to the contention based resource region from the BS through such a method and transmit the message based on the transmitted configuration information.

Further, since the configuration information may be transmitted through a message other than the system information message, when the configuration information is modified, the configuration information may be reflected promptly to transmit the message, thereby reducing the overhead of the system.

FIGS. 23 and 24 are diagrams illustrating one example of configuration information for a contention based resource region to which the present invention may be applied.

Referring to FIGS. 23 and 24, the BS may inform the UE of the configuration of the contention based resource region, the available resource, and the unavailable resource through the configuration information transmitted through the system information illustrated in FIG. 22.

Specifically, the configuration information included in the system information includes preamble transmission region information indicating a resource region in which the preamble is transmitted in the contention based resource region, transmission region information indicating a resource region available for transmission of the message, and non-transmittable area information indicating a resource region in which it is impossible to transmit the message.

FIGS. 23(a) to 23(c) illustrate an example of a format of the configuration information.

FIG. 23(a) may notify the UE of a transmittable region of the message through an indicator indicating the availability of the entire transmission region.

That is, through the configuration information, the BS may notify the UE of where the preamble transmission region is in the contention based resource region, the number of transmission regions for transmitting the message, and whether the transmission region is available or unavailable in overall.

For example, in FIG. 23(a), when an available identifier of the configuration information is set to '0', it is indicated that the entire transmission region for transmitting the message is unavailable and when the available identifier is set to '1', it is indicated that the entire transmission region for transmitting the message is available.

FIG. 23(b) may inform the UE of whether the transmission region is available by the unit of the transmission region (or by the unit of a slot) through a bitmap type indicator.

That is, through the configuration information, the BS may notify the UE of where the preamble transmission region is in the contention based resource region, the number of transmission regions for transmitting the message, and a transmission region available in the transmission region.

For example, in FIG. 23(b), when the available indicator is set to '0b01', it is indicated that a first transmission region is available and a second transmission region is unavailable among the transmission regions for transmitting the message.

FIG. 23(c) may inform the UE of the number of available transmission regions through the indicator.

That is, through the configuration information, the BS may notify the UE of where the preamble transmission region is in the contention based resource region, the number of transmission regions for transmitting the message, and the number of transmission regions available in the transmission region.

For example, in FIG. 23(c), when the available indicator is set to '1', it is indicated that one transmission region is available among the transmission regions for transmitting the message and when the available indicator is set to '2', it is indicated that two transmission regions are available.

In this case, when only some transmission regions are available, index information and the like may be transmitted together to indicate which transmission area is available.

FIG. 24 may inform the UE of whether it is possible to transmit the message by the unit of a subframe through the available indicator.

That is, as illustrated in FIG. 24, it is possible to inform the UE of how many subframes are available or unavailable through the available indication.

Based on the configuration information in the system information, the UE may determine a location where the contention based resource region is allocated, a location of a transmission area for transmitting the preamble in the contention based resource region, the number of transmission regions allocated for transmitting the message in the contention based resource region, and the available transmission region and the unavailable transmission region in the allocated resource region.

FIGS. 25 and 26 are diagrams illustrating one example of an update period of the configuration information for a dynamic configuration of the contention based resource region to which the present invention may be applied.

Whether the contention based transmission region for transmitting the message configured in FIG. 24 is available or not may be dynamically updated (or modified or updated) by the unit of a minimum specific cycle and information of the dynamically updated transmission region is included in the configuration information to be transmitted to the UE within the specific cycle.

The information of the dynamically updated transmission region is applied to the contention based transmission region mapped to the specific cycle. The mapped contention based region may be one or more contiguous intervals. That is, the mapped contention based region may span multiple transmission time intervals (TTIs).

For example, as illustrated in FIG. 19(a), one preamble transmission region and two message transmission regions may be mapped to the specific cycle.

In this case, the message transmission region of the contention based resource region may not be changed more than once in the specific cycle.

That is, when the availability of the transmission region is changed dynamically more than once in the specific cycle, the UE needs to continuously check the configuration information during the specific cycle, so that the overhead of the UE may increase. Accordingly, it is preferable that the message transmission region is not changed more than once in the specific cycle.

A start time of the specific cycle is a previous time as much as a processing delay indicating a delay for processing the configuration information in the preamble transmission region and the message transmission region and the specific cycle period.

That is, the start time of the specific cycle may be expressed by Equation 2.

Start time of specific cycle=time at which the preamble transmission area and message transmission area are allocated−(specific cycle period+processing delay)　　[Equation 2]

In Equation 2, the "preamble transmission region" and message transmission region" include both the available region and the unavailable region.

FIG. 25 illustrates an example of a case where the specific cycle period is 20 TTIs (assuming TTI=1 subframe and is hereinafter referred to as a subframe) in frequency division duplex (FDD) and the processing delay is 3 subframes.

As illustrated in FIG. 25, when the preamble transmission region and the message transmission region are allocated to subframe "4-1", the start point of the specific cycle becomes subframe "1-8" which is previous by 3 subframes which are the processing delay and 20 subframes which are the period of the specific cycle from subframe "4-1".

FIG. 26 illustrates an example of a case where the period of the specific cycle is 10 subframes and the processing delay is 3 subframes in the division duplex (TDD).

As illustrated in FIG. 26, when the preamble transmission region and the message transmission region are allocated to subframe "3-4", the start point of the specific cycle becomes subframe "2-5" which is previous by 3 subframes which are the processing delay and 10 subframes which are the period of the specific cycle from subframe "3-4".

When the modified configuration information is transmitted in the specific cycle, the UE needs to recognize that the information on the contention based transmission region is dynamically changed and receive the message including the modified configuration information.

Hereinafter, a method in which the UE recognizes transmission of the dynamically modified configuration information and receives the message including the configuration information will be described.

FIGS. 27 to 29 are diagrams illustrating one example of, in a case where the configuration information for the contention based resource region is dynamically updated, one example of a method for identifying the configuration information to which the present invention may be applied.

In the case where the configuration information in which the availability of the message transmission region is dynamically changed is transmitted during the specific cycle described with reference to FIG. 25 and FIG. 26, the UE needs to recognize the configuration information and receive the message including the modified configuration information.

The following methods may be used for the UE to recognize the dynamic modification of the configuration information.

First, the UE may determine whether the configuration information is dynamically modified by recognizing the identifier indicating that the dynamically modified configuration information is transmitted.

The identifier may be masked on a physical downlink control channel (PDCCH).

That is, the identifier indicating the message is included in the control information for the message (for example, a physical region to which the PDCCH message is transmitted) and transmitted to allow the UE to recognize that the dynamically modified configuration information is transmitted.

The UE monitors the identifier (e.g., a DA-RNTI) indicating the dynamically modified configuration information in addition to an identifier (SI-RNTI) representing the system information and an identifier (P-RNTI) of the paging message to determine whether the configuration information for the contention based region is dynamically modified and receive the message including the configuration information.

Tables 2 and 3 below show an example of the RNTI in the LTE system when the identifier indicating the dynamically modified configuration information is referred to as DA-RNTI.

TABLE 2

| Value (hexadecimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI and TPC-PUSCH-RNTI (see note) |
| 003D-FFF3 | C-RNTI, Semi-Persistent Scheduling C-RNTI, eIMTA-RNTI, Temporary C-RNTI, TPC-PUCCH-RNTI and TPC-PUSCH-RNTI |
| FFF4-FFFB | Reserved for future use |
| FFFC | DA-RNTI |
| FFFD | M-RNTI |
| FFFE | P-RNTI |
| FFFF | SI-RNTI |

TABLE 3

| RNTI | Usage |
|---|---|
| P-RNTI | Paging and System Information change notification |
| SI-RNTI | Broadcast of System Information |
| M-RNTI | MCCH Information change notification |
| RA-RNTI | Random Access Response |
| eIMTA-RNTI | eIMTA TDD UL/DL configuration notification |
| Temporary C-RNTI | Contention Resolution (when no valid C-RNTI is available) |
| Temporary C-RNTI | Msg3 transmission |
| DA-RNTI | Dynamic resource activation |

That is, the UE monitors the DA-RNTI to determine whether the dynamically modified configuration information is transmitted, in addition to the information of the contention based resource region acquired through the system information.

When the UE recognizes the transmission of the dynamically modified configuration information through the monitoring of the DA-RNTI, the UE may determine the preamble transmission region and the available message transmission region in the contention based resource region based on the information on the contention based resource region included in the system information and the dynamically modified configuration information.

For example, it is assumed that the following conditions are present as illustrated in FIG. 27.

TDD
UL-DL configuration: DSUUUDDDDD (D: Downlink subframe, U: Uplink subframe, S: Special subframe)
Contention based transmission region: Subframe #4 in all radio frames
Total number of contention based message transmission regions: 2
Total number of available contention based message transmission regions: 1
Total number of available transmission areas changed through dynamically updated configuration information: 2
Cycle period: 6

In this case, when the UE uses the contention based transmission region in subframe "2-4", the DA-RNTI may not be discovered within a range of cycle 1, only contention based transmission region 1 (slot #1) in subframe "2-4" may be used.

However, when the UE uses the contention based transmission area in subframe "3-4", the UE may discover the DA-RNTI in subframes "2-5" to "3-0" which are a range of cycle 2, and as a result, the UE may recognize that the configuration information for the contention based transmission region in subframe "3-4" is dynamically modified.

Therefore, the UE may know that the number of available transmission areas is to two and transmit data using at least one of the two transmission areas in subframe "3-4".

As described above, the UE may determine whether the configuration information is modified through the identifier indicating that the configuration information for the dynamically changed contention based transmission region is transmitted, that is, whether the available transmission region in the contention based resource region is changed.

Second, the configuration information is included in a broadcast message (e.g., a paging message, etc.) transmitted every minimum unit (e.g., a transmission time interval) and transmitted to allow the UE to determine whether the configuration information is modified every minimum unit.

The UE continuously monitors the system information (SI-RNTI) and the paging (P-RNTI) to determine whether the information on the contention based resource region acquired through the system information is changed.

When the UE discovers the dynamically modified configuration information included in the paging message, the UE may determine the preamble transmission region and the available message transmission region in the contention based resource region based on the information included in the system information and the dynamically modified configuration information.

For example, it is assumed that the following conditions are present as illustrated in FIG. 28.

TDD
UL-DL configuration: DSUUUDDDDD
Contention based transmission region: Subframe #4 in all radio frames
Total number of contention based transmission regions: 2
Total number of available contention based transmission regions: 1
Total number of available transmission areas changed through dynamically updated configuration information: 2
Cycle period: 6

In this case, when the UE uses the contention based transmission region in subframe "2-4", the paging message in the cycle mapped to the contention based transmission region does not contain the dynamically modified configuration information, the preamble transmission region and the available message transmission region may be determined in the contention based resource region.

Therefore, the UE may use only subframe "2-4" transmission region 1 (slot #1).

However, when the UE uses the contention based transmission region in subframe "3-4", the paging message transmitted in subframes "2-5" to "3-0" includes the dynamically modified configuration information, and as a result, the UE may receive the dynamically modified configuration information through the paging message transmitted in the cycle.

Therefore, the UE may know that the number of available transmission areas is to two by recognizing that the configuration information for the contention based transmission region in subframe "3-4" is dynamically modified and transmit data using at least one of the two transmission areas in subframe "3-4".

Third, when the BS dynamically modifies the configuration information for a specific contention based transmission region, the BS transmits the modified configuration information included in a multicast message (for example, a random access response message) and receives the multicast message including the information to determine whether the configuration information is modified.

The UE continuously monitors all identifiers (RA-RNTI) of the random access response message to determine whether the configuration information for the contention based resource region acquired through the system information is dynamically modified.

When the UE may not discover the random access response message including the dynamically modified configuration information through the monitoring of the RA-RNTI, the UE may determine the preamble transmission region and the available message transmission region in the contention based resource region based on the information on the contention based resource region included in the system information.

However, when the UE discovers the random access response message including the dynamically modified configuration information through the monitoring, the UE may determine the preamble transmission region and the available message transmission region in the contention based resource region based on the information on the contention based resource region included in the system information and the dynamically modified configuration information.

Fourth, the UE monitors the system information (SI-RNTI) and the paging (P-RNTI) so that the UE may determine whether the configuration information is dynamically modified.

Specifically, the UE continuously monitors the SI-RNTI and the P-RNTI, and when the SI-RNTI and the P-RNTI do not instruct to update (or change) the system information, since the configuration information for the contention based transmission region is not dynamically modified, the preamble transmission region and the available message transmission region in the contention based resource region are determined based on only information related to the contention based resource region included in the system information.

However, when the SI-RNTI and the P-RNTI instructs the update (or change) of the system information, the UE may monitor the identifier (DA-RNTI) indicating that dynamically modified configuration information is transmitted during the system information modification period and determine whether the configuration information is dynamically modified.

When the UE receives the message including the dynamically modified configuration information, the UE may determine the preamble transmission region and the available message transmission region in the contention based resource region based on the information related to the contention based resource region included in the system information and the dynamically modified configuration information.

For example, as illustrated in FIG. 29, the UE may recognize that there are five transmission regions for transmitting the message in the contention based resource region, and only one transmission region out of five transmission regions is available and fourth transmission regions are unavailable through the system information.

In this case, the information indicating the availability of the transmission region may be expressed in the form of a bitmap. For example, the information may be set to '1' when the transmission region is available and to '0' when the transmission region is unavailable.

When a field (e.g., a systemInforModification field in the paging message and a systemInfoValueTag field in the system information) for identifying the change of the system information indicates a change in the system information in a specific system change cycle, the UE may recognize that the system information is changed in the next change period of the specific system change cycle.

Further, the UE recognizes that the configuration information for the contention based transmission region may be modified dynamically during the specific system change period and monitors the identifier (DA-RNTI) indicating that the dynamically modified configuration information is transmitted to determine whether the modified configuration information is modified.

When the number of available transmission regions is changed to two by using primary dynamic update, the UE monitors the identifier and receives the dynamically modified configuration information to determine that the number of available transmission regions is changed to two.

Thereafter, when the number of available transmission regions is changed to three by using primary dynamic update, the UE monitors the identifier and receives the dynamically modified configuration information to determine that the number of available transmission regions is changed to three.

FIG. 30 is a diagram illustrating one example of a method for updating the configuration information through a change request of the configuration information for the contention based resource region to which the present invention may be applied.

Referring to FIG. 30, the UE may modify the configuration information by requesting the BS to change the availability of the transmission region for transmission of the message in the contention based transmission region.

Specifically, the UE may confirm the configuration of the contention based transmission region, the transmission region for transmitting the preamble, the transmission region for transmitting the message, the available transmission region, and the unavailable transmission region by receiving the system information from the BS.

When the UE desires to change the configurations of the available transmission region and the unavailable transmission region, the UE transmits a request message (configuration change request message) for requesting the modification of the configuration information to the BS (30010).

The UE may transmit the configuration change request message to the BS in a specific situation. For example, the UE may transmit the configuration change request message to the BS in the following three situations.

Preamble transmission failure

Message transmission failure

Message transmission region does not exist (for example, when all transmission regions are not available)

Since the configuration change request message is a message for requesting a change of the transmission area of the contention based resource region in which a plurality of UE may transmit a message without scheduling of the BS, the BS does not need to know which UE transmits the configuration change request message.

Accordingly, the configuration change request message may be transmitted to the BS through an on/off type channel that may be simultaneously used by multiple UE.

Thereafter, after step S30010, the UE continuously monitors the message to receive the message including the modified configuration information.

After step S30010, the BS may transmit the message including the modified configuration information to the UE (S30020) and the UE may determine the preamble transmission region and the available message transmission region based on the received configuration information(s).

In this case, the modification of the configuration information for the transmission region may be performed through the system information or dynamically performed through the message mentioned in the present invention.

Through such a method, the UE may directly request the change in a configuration for the availability of the transmission region for the message transmission in the contention based resource region.

FIG. 31 shows one example of an internal block diagram of a wireless device to which the present invention may be applied.

Here, the wireless device may be an eNB and a UE, and the base station includes both a macro eNB and a small eNB.

As shown in FIG. 31, the eNB 3110 and the UE 3120 include communication units (transmitting/receiving units, RF units, 3113 and 3123), processors 3111 and 3121, and memories 3112 and 3122.

The eNB and the UE may further input units and output units.

The communication units 3113 and 3123, the processors 3111 and 3121, the input units, the output units, and the memories 3112 and 3122 are operatively connected with each other in order to conduct the methods as proposed in the present disclosure.

The communication units (transmitting/receiving units or RF units, 3113 and 3123), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 3111 and 3121 implement functions, procedures, and/or methods as proposed in the present disclosure. The layers of radio interface protocols may be implemented by the processors.

The processors may be represented as control parts, controllers, control units, or computers.

The memories 3112 and 3122 are connected with the processors and store protocols or parameters for performing the function, procedure and/or method proposed in the present disclosure.

The processors 3111 and 3121 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The RRC connection method in the wireless communication system according to the present invention which may be applied to the 3GPP LTE/LTE-A system has been mainly described above. The present disclosure is not limited to this. The RRC connection method in the wireless communication system according to the present invention may be equally applied to various wireless communication systems in addition to the 3GPP LTE/LTE-A system.

The invention claimed is:

1. A method for transmitting and receiving data by a device in a wireless communication system, the method comprising:
    receiving configuration information for dynamic allocation of a contention based resource region from a first node, the contention based resource region including a resource region capable of transmitting and receiving data without connection with the first node; and
    transmitting a preamble and a specific message in the contention based resource region based on the configuration information, the configuration information including region information informing the contention based resource region, first resource information informing an available resource in the contention based resource region, and second resource information informing an unavailable resource in the contention based resource region.

2. The method of claim 1, wherein the configuration information is modified for each specific period, and
    the modified configuration information is transmitted to the device within the specific period.

3. The method of claim 2, wherein the modified configuration information is applied after the specific period and a predetermined processing delay.

4. The method of claim 2, wherein the modified configuration information includes an identifier informing whether the configuration information is modified.

5. The method of claim 4, further comprising:
    when the identifier informs that the configuration information is modified, monitoring whether the modified configuration information is transmitted; and receiving the modified configuration information from the first node.

6. The method of claim 1, wherein the configuration information is included in system information, a paging message, or a multi-cast message transmitted through a multi-cast.

7. The method of claim 6, wherein the system information, the paging message, or the multi-cast includes an identifier informing whether the configuration information is modified.

8. The method of claim 7, further comprising:
when the identifier informs that the configuration information is modified, receiving the modified configuration information from the first node.

9. The method of claim 1, further comprising:
transmitting a request message for requesting modification of the configuration information to the first node; and
receiving a response message including the modified configuration information as a response to the request message.

10. The method of claim 1, wherein the contention based resource region is comprised of a preamble transmission region for the preamble transmission and a message transmission region for transmitting the specific message.

11. The method of claim 10, wherein the message transmission region is adjacent to the preamble transmission region along a frequency axis or a time axis or positioned between the preamble transmission regions.

12. The method of claim 1, wherein the specific message is a random access request message for requesting random access to the first node.

13. The method of claim 12, further comprising:
receiving a random access response message as a response to the random access request message.

14. The method of claim 13, wherein the random access response message includes resource allocation information allocated for transmission of an uplink message requested by the random access request message.

15. A device for transmitting and receiving data in a wireless communication system, the device comprising:
a communication unit transmitting and receiving a radio signal to and from the outside; and
a processor controlling the communication unit,
wherein the processor is configured to:
receive configuration information for dynamic allocation of a contention based resource region from a first node, and
transmit a preamble and a specific message in the contention based resource region based on the configuration information,
the contention based resource region includes a resource region capable of transmitting and receiving data without connection with the first node, and
the configuration information includes region information informing the contention based resource region, first resource information informing an available resource in the contention based resource region, and second resource information informing an unavailable resource in the contention based resource region.

* * * * *